United States Patent [19]
Nelson et al.

[11] Patent Number: 5,985,197
[45] Date of Patent: *Nov. 16, 1999

[54] METHOD OF MANUFACTURING A COMPOSITE GOLF CLUB HEAD

[75] Inventors: Ronald H. Nelson, Salt Lake County; Dimitrije Milovich, Salt Lake City; Paul Nordstrom Clark, Sandy; Gregory Joseph Loughry, Salt Lake City, all of Utah

[73] Assignee: Radius Engineering, Inc., Salt Lake City, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/839,110

[22] Filed: Apr. 23, 1997

[51] Int. Cl.⁶ ............ B29C 43/10; B29C 70/44; B29C 35/02
[52] U.S. Cl. ............ 264/221; 156/189; 156/194; 156/308.4; 264/314; 264/317
[58] Field of Search .................. 264/221, 317, 264/314, 136, 137; 156/194, 189, 308.4

[56] References Cited

U.S. PATENT DOCUMENTS

| Re. 35,334 | 9/1996 | Moore et al. | 264/489 |
|---|---|---|---|
| 1,515,390 | 11/1924 | Hubbard . | |
| 2,345,977 | 4/1944 | Howald et al. | 18/55 |
| 2,837,769 | 6/1958 | Wagner | 18/53 |
| 3,136,831 | 6/1964 | Zinn | 264/225 |
| 3,518,338 | 6/1970 | Tamussi | 264/221 |
| 4,124,678 | 11/1978 | Stroupe | 264/314 |
| 4,397,048 | 8/1983 | Brown et al. | 3/2 |
| 4,575,447 | 3/1986 | Hariguchi | 264/516 |
| 4,581,190 | 4/1986 | Nagamoto et al. | 264/136 |
| 4,614,627 | 9/1986 | Curtis et al. | 264/46.6 |
| 4,759,893 | 7/1988 | Krauter | 264/258 |
| 4,808,362 | 2/1989 | Freeman | 264/257 |
| 4,828,781 | 5/1989 | Duplessis et al. | 264/250 |
| 4,850,607 | 7/1989 | Trimble | 280/281.1 |
| 4,871,497 | 10/1989 | Natori et al. | 264/86 |
| 4,883,623 | 11/1989 | Nagamoto et al. | 264/108 |
| 4,902,458 | 2/1990 | Trimble | 264/46.6 |
| 4,904,423 | 2/1990 | Foreman | 264/25 |
| 4,931,247 | 6/1990 | Yeh | 264/258 |
| 4,964,640 | 10/1990 | Nakanishi et al. | 273/167 H |
| 4,982,975 | 1/1991 | Trimble | 280/281.1 |
| 4,986,949 | 1/1991 | Trimble | 264/258 |
| 5,007,643 | 4/1991 | Okumoto et al. | 273/167 R |
| 5,122,324 | 6/1992 | Yong-sup | 264/513 |
| 5,131,986 | 7/1992 | Harada et al. | 205/67 |
| 5,143,665 | 9/1992 | Clubbs et al. | 264/211 |
| 5,149,091 | 9/1992 | Okumoto et al. | 273/80.2 |
| 5,154,424 | 10/1992 | Lo | 273/167 H |
| 5,207,428 | 5/1993 | Aizawa | 273/174 |

(List continued on next page.)

FOREIGN PATENT DOCUMENTS

| 2 670 120 | 6/1992 | France . |
|---|---|---|
| 2 670 121 | 6/1992 | France . |
| 3034-870 | 9/1976 | Japan . |
| 2 250 443 | 6/1992 | United Kingdom . |

*Primary Examiner*—Jan H. Silbaugh
*Assistant Examiner*—Michael Poe
*Attorney, Agent, or Firm*—James Sonntag

[57] ABSTRACT

A process for manufacturing a golf-club head is disclosed comprising; shaping a fluid-removable core in the general form of the club head, placing a flexible inflatable bladder around the core, wrapping over the assembly of core and bladder at least one ply of fiber impregnated with a curable resin, placing the assembly of core, bladder, and impregnated fiber into a female mold, forming a cured part in the form of a golf-club head by inflating the bladder to force the plies against the inner surfaces of the mold and heating the mold to cure the resin, removing the cured part from the mold, disintegrating the fluid-removable core with a fluid sufficient to allow removal of the bladder from the interior of the cured part through a hole in the cured part, removing the bladder through the hole with any residues of the core within the bladder to form a hollow molded club head with a hollow interior essentially free from non-functional materials.

25 Claims, 15 Drawing Sheets

U.S. PATENT DOCUMENTS

| | | | |
|---|---|---|---|
| 5,207,964 | 5/1993 | Mauro | 264/221 |
| 5,242,168 | 9/1993 | Aizawa | 273/167 H |
| 5,242,646 | 9/1993 | Torigoe et al. | 264/219 |
| 5,248,552 | 9/1993 | Moore et al. | 428/323 |
| 5,260,009 | 11/1993 | Penn | 264/40.1 |
| 5,262,100 | 11/1993 | Moore et al. | 264/25 |
| 5,262,118 | 11/1993 | Fukushima et al. | 264/512 |
| 5,277,866 | 1/1994 | Wright | 264/572 |
| 5,290,493 | 3/1994 | Mauro | 264/37 |
| 5,314,653 | 5/1994 | Haralambopoulos | 264/301 |
| 5,328,176 | 7/1994 | Lo | 273/167 R |
| 5,338,024 | 8/1994 | Baum | 273/78 |
| 5,350,556 | 9/1994 | Abe et al. | 264/248 |
| 5,362,047 | 11/1994 | Shaw et al. | 273/77 A |
| 5,378,295 | 1/1995 | Yamashita et al. | 148/654 |
| 5,380,010 | 1/1995 | Werner et al. | 273/167 H |
| 5,410,798 | 5/1995 | Lo | 29/527 |
| 5,429,365 | 7/1995 | McKeighen | 273/173 |
| 5,470,517 | 11/1995 | Conley | 264/137 |
| 5,505,492 | 4/1996 | Nelson et al. | 280/819 |
| 5,505,795 | 4/1996 | Tsai et al. | 148/527 |
| 5,509,659 | 4/1996 | Igarachi | 473/345 |
| 5,511,787 | 4/1996 | Baum | 473/329 |
| 5,624,519 | 4/1997 | Nelson et al. | 156/245 |
| 5,814,268 | 9/1998 | Banchelin et al. | 264/516 |

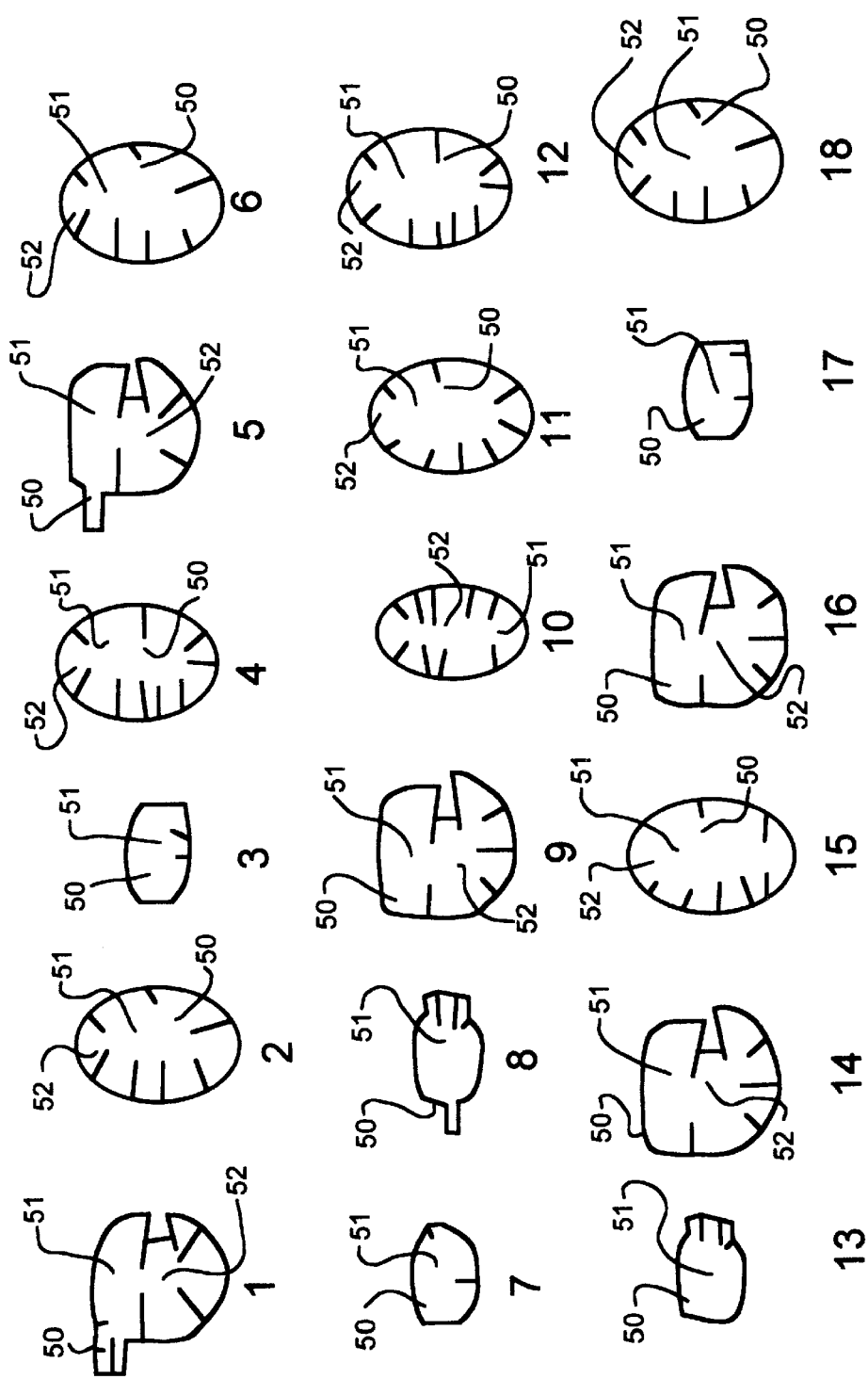
Fig. 4
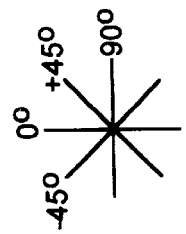

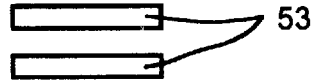
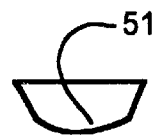
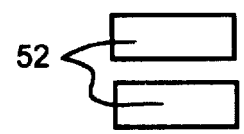
22  23  24
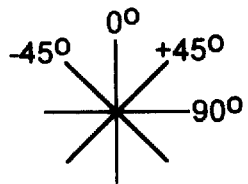
Fig. 5

METHOD OF MANUFACTURING A COMPOSITE GOLF CLUB HEAD

RELATED APPLICATIONS (Not applicable)

STATEMENT REGARDING FEDERALLY SPONSORED RESEARCH OR DEVELOPMENT (Not applicable)

FIELD OF THE INVENTION

This invention relates to the manufacture of golf club heads, particularly to the manufacture of wood-type or driver-type heads.

BACKGROUND ON GOLF CLUB HEAD PERFORMANCE

Wood-type heads are traditionally made from wood. However, with advances in materials, wood-type golf club heads have been made from various high-performance metals and other materials, such as titanium and fiber-reinforced plastics. Most club heads from fiber resin composite material are compression molded around relatively rigid molding cores. The majority of these finished club heads have a low quality composite, which is the result of difficulties in the process. To obtain a high quality composite in the club head using a rigid molding core, the core must be shaped very specifically and the uncured fiber resin material must be placed very precisely and systematically on the core to ensure that the proper amount of compaction occurs at all locations inside the golf club head.

Very few manufacturers have been willing to spend the money it takes to produce a high-quality composite in a golf club head. Instead, they often employ a process that combines an uncured resin with a heat-activated foaming agent around a foam core. Under low pressure, it expands and ensures almost full contact of the interior foam material to the outer composite material. The composite material in such heads is of a very low quality with high void content, low fiber content, and wrinkling of the reinforcing fibers.

In the few cases where the manufacturer has taken the time and expense to very accurately size and position all the materials going into the club head, other problems were encountered. The fiber resin material must be carefully positioned, one ply at a time, with intermediate compaction steps taken after every application of a few plies. This is very time-consuming and costly. Also the external shape design of such club heads is restricted to shapes which are more rounded in nature so the female tool applies a more uniform pressure to the exterior of the part. This imposes fairly serious shape design constraints. Most high performance club heads do not have these rounded shapes.

The club heads produced by the present invention do not suffer from these limitations. The high pressure exerted by the internal pressure bladder produces a very high quality product with low void content, high fiber volume laminate, better than the best costly compression molded club heads. The heads are also hollow which is a major benefit. Since the high compaction pressures are produced by the interior bladder, and not dependent on extremely precise sizing and placement of the uncured fiber resin material, the time and cost associated with laying up the uncured fiber resin material is reduced substantially. Also, since the compaction pressures are not dependent on the sizing and interaction of foam cores, the uncured fiber resin material, and the inside of the female tool, the club heads of the present invention have essentially no limitations in their shape.

A club head used with a particular shaft in a particular golf club type (i.e., a "driver" which is also known as a "number one wood", "number two wood", etc.) will have an optimum weight chosen to maximize the playability of the club. Generally this can be stated as a particular club type having a given shaft length will need to have a predetermined set of mass properties to obtain an optimal configuration for playability and performance. These mass properties are the balance point and the swing weight (the center of gravity and mass moments of inertia). Therefore a given club head will have a set weight in its optimal design, not the lowest weight possible. Typically, for example, a "driver" ("number 1 wood") will have a club head weight of about 200 grams.

Generally, for most golfers using a given golf club type, larger club heads are more desirable and work better than smaller club heads, especially for wood-type heads. This benefit can be understood in the simplest sense by realizing that it is easier to hit the ball (not miss hitting it) with a larger club head. More precisely, it can be understood that a larger club head will generally have larger mass moments of inertia, and thus will be more stable and less prone to rotate on off-center hits during ball impact. Sometimes golf club heads are said to have "sweet spots" on the club head face. These areas are dependent on the mass properties of the club head, and also on the elastic properties of face. In general, the larger the size of face of the club, the larger the "sweet spot," which makes it easier for a golfer to strike the ball.

Given these design constraints on the club head, intelligently designed composite club heads do not use composite materials to decrease the club head weight, but to decrease the amount of material needed to provide the necessary strength and stiffness in the head. This has been termed herein "reducing the minimum structural weight."

Once the minimum amount of composite material needed for strength and stiffness has been obtained, additional material is then added to the head, either composite material or metallic material, to bring the head weight up to the desired optimal weight. Reducing the minimum structural weight maximizes the flexibility for location of this additional weight. The placement and location of the weight inside the club head have a very pronounced effect on the playability and performance of the club head. As mentioned, the final mass properties of the weighted club head, primarily the center of gravity and mass moments of inertia, have a large impact on the overall club performance. Reducing the minimum structural weight maximizes the tailoring which can be accomplished on mass properties, which improves club playability.

As an example, a lightweight titanium head might have 90% of its weight located as needed for structural performance. That means that 20 grams out of the 200 gram weight might be available to be placed where needed for mass properties. An equivalent composite carbon fiber epoxy head of the present invention would have 65% of its weight located as needed for structural performance, allowing 70 grams to be placed where needed for optimal mass properties.

As mentioned, larger club head size generally improves playability. Club head size is usually termed and measured as club head volume. The lower density of composite materials also allows for the manufacture of larger club heads which have better playability. The higher strength of club heads of the present invention also allows even larger club head volumes than previously offered by lower strength composite club heads. As explained in the detailed description of this invention, the method of the present invention produces high quality composite heads, in part because there is no one location in the head where several ply terminations occur simultaneously.

The construction methods disclosed herein produce very high performance composite club heads. Further refinement of all the various manufacturing steps for use in high volume production is anticipated. It is expected that it will be recognized by those skilled in the art that the many variations possible without departing from the scope and spirit of this invention.

BACKGROUND OF THE INVENTION

One of the methods for forming fiber-reinforced composite club heads involves molding around a relatively rigid molding core, which may or may not be removed after cure. An example of such a method is disclosed in U.S. Pat. No. 4,581,190 to Nagamoto et al. The Nagamoto et al. reference discloses a process for making a club head where a fibrous bag of reinforcing fiber is placed over a rigid molding core. The fibrous bag, which in the patent drawings appears to resemble a paper sack, is impregnated with plastic. The plastic is cured by applying heat under external pressure, which presses the impregnated bag against the core during molding.

Nagamoto et al. discloses another method conceptually and describes it without any detail or drawings. In this method, the loosely arranged bag of fibrous reinforcing material is placed around a second bag of impervious material (vinyl chloride). Both bags are placed into a mold and the impervious bag is inflated by introducing air vapor or liquid (e.g., oil) under pressure to press the bag of reinforcing material against the wall of the cavity of the mold.

The Nagamoto et al. methods illustrate two approaches in the prior art for making club heads. The first approach involves forming impregnated fibers around a rigid molding core and curing the fibers by externally pressing the impregnated fibers against the rigid core. This class of methods has several disadvantages. The main one being the molding core usually remains in the interior of the club after molding. Nagamoto et al. mentions this "inconvenience" on line 35 column 4. The molding core is usually left in the head as permanent component of the head, or can sometimes be removed. To remove the core, it has been proposed to use various removable materials for the core such as various lost-mold compounds, low-melting salts or metals, waxes, and plastic foams that can be dissolved by a solvent. The difficulty is that the core material must be strong and heat-resistant to withstand the molding conditions, since the core must support the cure temperature and the compression of the fiber bag against the core. However, strength and heat resistance are counter to properties that allow easy removal of the core. Consequently, the core materials that have high temperature and strength properties for molding are either expensive, are hazardous materials and/or difficult to handle (such as low-temperature-melting salts or metals), or must be removed by toxic solvents. In addition, for many core materials, the molding pressure and temperature are limited by the physical properties of the core. For example, polystyrene foam cannot withstand higher temperature and higher pressures, which precludes its use in making high-compression composite materials. For high-pressure compression, only the higher strength core materials can be used, which usually bring about increased problems of safety, cost, and difficulty in handling or removal. The higher strength core materials, such as wax and low melt metal alloys, have substantial thermal mass, generally on the order of several times the composite material being molded. This high thermal mass is also on the inside of the head, with almost all composite materials having relatively high thermal resistance through the thickness of the laminate. The combination of these effects effectively lengthens the molding times considerably, because of the extra time required to heat the entire head and core structure. Decreasing molding cycle time by a factor of 2 or 4 would have a dramatic effect on the cost effectiveness and economic feasibility of a head manufacturing process.

The second approach in the Nagamoto et al. patent (disclosed at col. 4, lines 35 to 53) describes the second general approach for forming composite material heads, and avoids the problem of a core remaining in the molded article by eliminating the molding core. The process involves placing a bag of loosely arranged impregnated fibers around an impervious bag of vinyl chloride, which is inflated to press the impregnated fibers against the cavity walls in the mold. Since there is no molding core around which to place the fiber bag, the bag of fibers and the inflatable bag are only loosely placed together. When the bag is inflated, there is a large amount of movement of the fibers as the bag expands and moves the fibers against the cavity walls, and the fibers cannot be located with much precision. This causes the club head to have unpredictable fiber orientations because of the imprecision of the final fiber placement. In addition, the use of plies over only a portion of the club head or plies in a specific fiber orientation is precluded, because the reinforcing fibers must be in the form of a bag. It would be very difficult or nearly impossible, for example, to optimize the design of the club head by placement of one or more plies in selected portions of the club head to increase strength and stiffness in the portion. During expansion of the impervious bag, the surrounding fiber bag would tend to move significantly from their original position, and a specific placement of the fibers would be difficult due to the looseness of the initial placement of the bag.

The second Nagamoto et al. process does not describe any means for introducing a pressurized fluid or gas into the bag, or specific means for constructing the impervious bag and the raw material form used, or the means for attaching a pressure delivery source to the bag inside the mold, or the anticipated or required temperature and pressure capability of the impervious bag system. There is no indication of pressure levels that could be applied to a vinyl chloride impervious bag, and what molding temperatures could be. If the temperature increase of the gas initially in the bag provides the pressure, which would be the simplest approach and is disclosed by U.S. Pat. No. 4,575,447 to Hariguchi line 65, column 1, there would be several limitations. The pressures would be restricted to very low compaction pressures, and such pressures would not be controllable independently from the mold/part temperature.

An alternate process to the Nagamoto et al. inflatable bag molding process is disclosed in U.S. Pat. No. 4,575,447 to Hariguchi. In the Hariguchi process an impervious bag is manufactured as a hollow core of a material that is rigid at room temperature. The rigid core is shaped similar to the final shape. Impregnated fibers are placed around the hollow core and placed in a female mold. During molding, the core softens under heat of the molding, which then can be expanded by pressurizing the core. This presses the impregnated fibers against the mold. The pressure inside the core can be provided by thermal expansion of air sealed inside the head, or by introduction of a pressurized medium. The problem with this approach is that the hollow core is limited to rigid materials that can be softened and inflated during molding. In addition, the softened hollow core becomes attached and incorporated into the interior of the club head. Thus, the inflatable core remains as a permanent part of the club head. The thermoplastic core, which for a material like polyethylene, would be limited to low pressures at the cure temperatures that are typically used in composite sporting goods manufacturing. Since the process relies on a rigid material that softens at a particular temperature, the entire process would have to be designed around this temperature, regardless of its suitability for processing, i.e., the curing of the composite. Application of pressure to the rigid core below the softening temperature would not supply any compaction pressure to the composite because of the core's rigidity. It is desirable to apply compaction pressure over a wide range of temperatures during the cure, even at near room temperature conditions when the mold is just closed. If thermal expansion of the air trapped inside the core is used for pressure, the process would be limited to relatively low pressures from the core.

In summary, prior-art systems, suffer from one or more of the following problems:

(1) Significant residue remains in the interior of the molded club, either
   (a) an entire molding core that is hard to remove, or is otherwise a toxic or difficult material that requires special handling, or
   (b) an inflatable bag or core remains and becomes incorporated with the club head material and cannot be removed;

(2) Low molding pressures are used because of the inherent weakness of the inflatable materials being used and their inability to retain high pressure under the high molding temperatures. Weakness in the finished club head results from low compaction of the fibers produced by low molding pressures, which causes a lower fraction of structural fiber in the composite part relative to the resin;

(3) Weaknesses and unpredictable wall thicknesses at critical locations occur in the final molded part due to movement of the plies during molding (See, for example, U.S. Pat. No. 4,575,447 to Hariguchi line 45, column 1) or inaccurate placement of plies.

(4) The processing pressure is apparently dependent upon the temperature for some of the processes. This leads to less than optimal processing conditions.

OBJECTS OF THE INVENTION

It is, therefore, an object of the invention to provide a process for the manufacture of composite golf club heads.

It is further an object of the invention to provide a process that allows for accurate placement of the plies of fibrous material in the final molded part.

It is further an object of the invention to provide a process wherein there is little or no residue from the molding process remaining in the interior of the club head.

It is further an object of the invention to provide a process for the manufacture of a club head that allows for high pressure molding of the composite, to form a high fiber volume composite laminate with low void content.

It is further an object of the invention to provide all these aspects listed above, in a golf club head which is an almost entirely closed shape, which can be made with only a small opening in the as molded state, from which all the interior molding features are easily removed after molding.

Further objects of the invention will become evident in the description below.

SUMMARY OF THE INVENTION

An embodiment of the invention is a process which has the advantages of both a relatively rigid molding core processes and an inflatable bag process, but avoids major disadvantages of each. The initial preform of uncured impregnated fiber is formed around a mandrel core or forming core surrounded by an inflatable bladder, so that the preform is dimensioned near to the final shape and does not require significant movement of fibers to conform to a mold cavity. The mandrel core is used only for formation of the uncured preform of uncured resin composite, and it is not used in the actual molding process. Therefore, the strength and heat resistance of the mandrel core is not critical.

Before the impregnated fibers are placed around a core, the core is placed in an inflatable, fluid-impervious bladder. During molding, the bladder is inflated to press the impregnated fibers against female tooling. Since the core does not have to withstand the pressure and temperature molding conditions, it may be made of materials that are structurally weak and unable to withstand elevated molding pressures and temperatures. This allows the use of materials that are completely unsuitable as rigid molding cores in prior-art systems. Thus, a material can be used, such as starch foam, that can be easily removed by dissolving with a readily available and non-toxic solvent, water. Previously such materials have not been used in composite processes because they do not have the strength to withstand molding conditions. However, since the mandrel core is only used for laying up the part, it does not function as a support or molding core during the compressing and heating during molding. For this reason, a molding core material may be chosen that may or may not withstand the high temperature and pressure conditions of molding.

After molding, in the preferred embodiment of the invention, the core can then be easily removed merely by injecting water into the inflation bladder inside the molded part to disintegrate or dissolve the core sufficiently to allow it to be washed out and allow subsequent removal of the bladder. No special handling or disposal is required, which would be the case for removal of molding cores of liquid salts or plastics dissolvable only in organic solvents. The bladder is made of a heat resistant plastic that does not soften or react with the interior of the interior of the molding part. Thus, it can become separated therefrom and be easily removed, along with any small residue of the mandrel core that may be within the bladder.

Additionally, in the preferred embodiment of this invention, the bladder consists of a thin film, that consists of only a small volume of material. The film bladder can then be removed by pulling out of a small opening in the molded part. Additionally the thin film bladder itself can be a soluble plastic, preferably water soluble, such as poly vinyl alcohol (PVA) film. The use of easily soluble bladder films is advantageous where extremely small openings are used for inflation during molding and removal subsequently. Soluble films are also used if molding of complex features on the inside of the part might inhibit removal of the bladder. Such complexities might involve cocured features inside the head.

BRIEF DESCRIPTION OF THE DRAWINGS

FIG. 4 is a plan view of a set of plies of resin impregnated carbon fiber for placement around an assembly as in FIG. 3.

FIG. 5 is a plan view of porous carbon mats used in manufacture of the club head.

PARTS LIST

Figure 1:
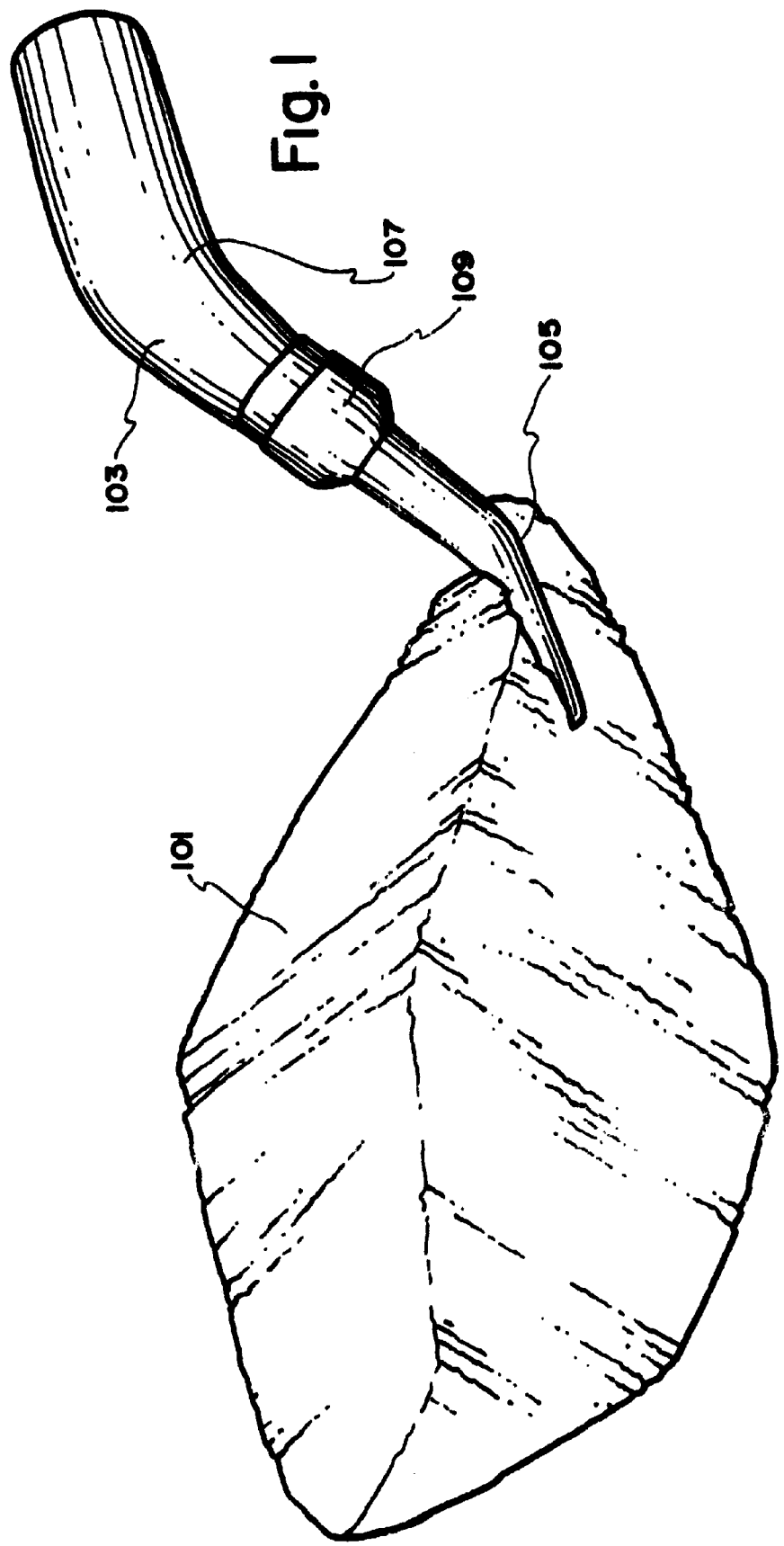
FIG. 1 is a perspective view of a soluble mandrel core used in the process of the invention combined with an incomplete inflation fitting used later in the process for bladder inflation.

A list of the part numbers used in the figures with a brief description is included below:
Part Number Description
50 designates portions of the preforms that correspond to the hosel
51 designates portions of the preforms that correspond to the face
52 designates portions of the preforms that correspond to the sole
53 designates portions of the plies that correspond to the crown
101 foam mandrel core
103 incomplete inflation fitting
104 completed inflation fitting
105 rigid tube for inflation fitting
107 silicon rubber tubular member for inflation fitting
109A inner self vulcanizing rubber tape for inflation fitting
109B outer self vulcanizing rubber tape for inflation fitting
111 bladder
115A, B, C first three seals on heat sealable film bladder
115D final bladder seal
117 bladder inflation fitting opening
119 mandrel core insertion edge of bladder
123 vacuum line and valve for part lay up
125 core/inflation-fitting/bladder assembly
127 prepreg fiber resin material plies
129 unimpregnated carbon felt mats
131 wrapped club head assembly
132 mold heating platen
133 female mold
134 mold match pin
135 top mold half of female mold
136 mold handle
137 bottom mold half of female mold
138 heating platen insulator
139 mold thermocouple connection
141 mold cooling lines
143 mold tubular barbed fitting for bladder inflation fitting
144 mold bladder inflation line
145 tool prepreg plies
146 mold "O" ring vacuum groove
147 removable mold insert
150 mold vacuum line
151 molded part prior to trimming or drilling
153 top hosel hole in club head
155 hollow club head interior
157 golf club shaft
159 optional interior club head shaft attachment sleeve
161 club head weighting insert
163 bottom hosel hole in the sole of club head
200 mold temperature during molding
201 bladder pressure during molding
202 bladder pressure pulsing during molding
203 mold cavity vacuum during molding
205 water injection fitting
206 finished and trimmed club head

DETAILED DESCRIPTION OF THE INVENTION

A mandrel core is formed from a soluble material that is in the general shape of the final club head, but smaller to accommodate the bladder and the prepreg materials, and to allow insertion of the assembly of the shape, bladder and prepreg into the mold. While the dimensions of the shape are not critical, it is preferred to have the dimensions as large as practical to minimize movement of the prepreg material during inflation of the bladder in the molding process.

The core may be formed by any suitable method, such as by molding, or formed from a larger piece using, for example, cutting, sanding, carving, sawing, and the like. When the material of the shape is the preferred steam-blown starch, the shape is preferably formed from a large block using conventional wood shaping methods.

The core is of a soluble material that is preferably water soluble, preferably a starch. Since the shape is not required in the actual molding process, it is not necessary that it maintain its integrity in the heat and pressure of the molding environment. Therefore, inexpensive readily available materials are preferred. It is necessary that the solid material be sufficiently soluble to allow its removal after molding. In addition, the core material should not form a material during the molding process that is difficult or impossible to remove. For example, some blown plastic materials, such as styrene foam, while ordinarily very soluble in an organic solvent, collapses into a dense difficult to dissolve solid pea at molding temperatures. A material should be chosen that does not leave residue in the interior of the finished molded golf-club head that would prevent or materially inhibit the removal of the bladder. Preferably the material when dissolved leaves no solid residue, but if a solid residue does remain it should be fine enough to not significantly interfere with bladder removal.

Water soluble materials are preferred as water is readily available and easy to dispose of. In addition, non-toxic, and non-hazardous materials and processes are preferred for personnel safety and for trouble-free and economical disposal of the wash solution. Other materials that are soluble or react in a sufficient manner for the solid to disintegrate enough to allow removal of the bladder are contemplated, but are generally not preferred, because the solvents required, such as acids and organic liquids, are often expensive, require expensive apparatus for recovery or fume control, etc. In general, any core material that can be made soluble or disintegrated to allow removal of the bladder from the final molded part is contemplated. This includes materials that are fluid removable, i.e., can be dissolved, or reacted by any suitable fluid, gas or liquid, that is injected into the bladder after the part is molded.

In summary, the preferred material is readily soluble in water, is not a hazardous or unsafe material, presents no extensive waste disposal problem, and leaves essentially no residue in the bladder interior that would interfere with easy removal of the bladder from the molded part. Materials that have been found suitable are starch materials, particularly steam blown starch foams. These materials are available under the name ECO-FOAM™ from American Excelsior Co., 8500 Avenue H, East Arlington, Tex. The material uses Hylon VII starch available from National Starch and Chemical Company, 10 Findeme Ave., Bridgewater, N.J.

After the shape is formed, it is surrounded by a flexible bladder. The flexible bladder may be of any suitable material that allows placement of the shape within the bladder, is flexible enough to generally conform to the shape, and is capable of being inflated and maintaining at a high internal pressure during the molding process. Preferred materials are heat-resistant thermoplastics. A suitable film of this type (1 mil thickness) is available from Airtech Advanced Materials Group, 2542 East Del Arno Blvd., Carson, Calif. 90749-6207, under the name of Wrightlon 4500 Release Film . These halohydrocarbon-based films are particularly suitable because of its elasticity, strength, and ease of release from epoxy resins.

Other suitable materials include, but are not limited to water soluble films, such as PVA and PVAL films. These films are heat sealable films formed using polyvinyl alcohol. A suitable water-soluble PVAL film (2 mil thickness) is manufactured by Aicello North America Incorporated, North Vancouver, B.C., Canada and available from Mitsui Plastics, Inc., 11 Martine Ave, White Plains, N.Y. 10606 under the name Solublon KA™. Non heat sealable materials are also contemplated, such as Silicone and Latex materials.

The bladder is preferably formed in a conventional manner for the material from which it is fabricated. For heat-sealable materials, a two-panel "sandwich bag" can be formed from separate sheets or a tube by sealing the edges of the bag using a heated sealing bar. The bladder may also be for med from other suitable methods, such as molding, dipping and curing around a mandrel, and the like, as long as a suitable bladder with the necessary properties can be formed. The bladder is preferably shaped to approximate the shape of the core. The bladder also has an opening through which the bladder may be inflated, which may or may not be an opening through which the core in inserted into the bladder. Also inserted into the bladder is an inflation fitting around which the inflation opening of the bladder is sealed and through which the bladder is inflated. In a preferred method, the bladder is formed by sealing edges of two thermoplastic plies, except for one long edge which is left open for insertion of the core and inflation fitting and an opening for the inflation fitting. After insertion of the core and inflation fitting through the unsealed long edge, that edge is heat sealed. In this way the bladder is formed to more easily conform to the core and inflation fitting as well as to the mold interior without excessive folding.

The inflation fitting is generally tubular and configured to allow sealing of the bladder around the fitting so that the bladder can retain pressure. The inflation fitting may be any suitable material, for example, a metal tube with a silicon jacket to allow the bladder to be sealed to the inflation fitting. The inflation fitting may also function as a mandrel over which plies for the hosel of the club head are formed. The hole in the final molded part through which the inflation fitting formerly passed then corresponds to the mounting hole for a golf club shaft. Alternately, the hosel may be formed around part of the foam core with the inflation fitting placed elsewhere. The hole in the final part for the inflation fitting may then be plugged by any suitable means, such as by curing a fiber composition material in the hole, or it may function to mount weights, striking surfaces, plaques, labels, or the like. A hole may also be disposed in the bottom sole of the head such that when the head is mounted, the shaft extends through the hosel, though the club head and out through the hosel to reinforce the attachment of the shaft.

SPECIFIC EXAMPLE OF PREFERRED EMBODIMENT SHOWN IN DRAWINGS

As a specific example, referring to FIG. 1, which shows a foam core 101 with an incomplete inflation fitting 103 pushed into the foam core. The inflation fitting is also placed to function as a mandrel around which plies for the club head hosel are placed. The incomplete inflation fitting 103 comprises a copper tube 105 and silicon rubber tubular member 107 which is fixed to the copper tube with the inner self vulcanizing rubber tape 109A.

Figure 2:
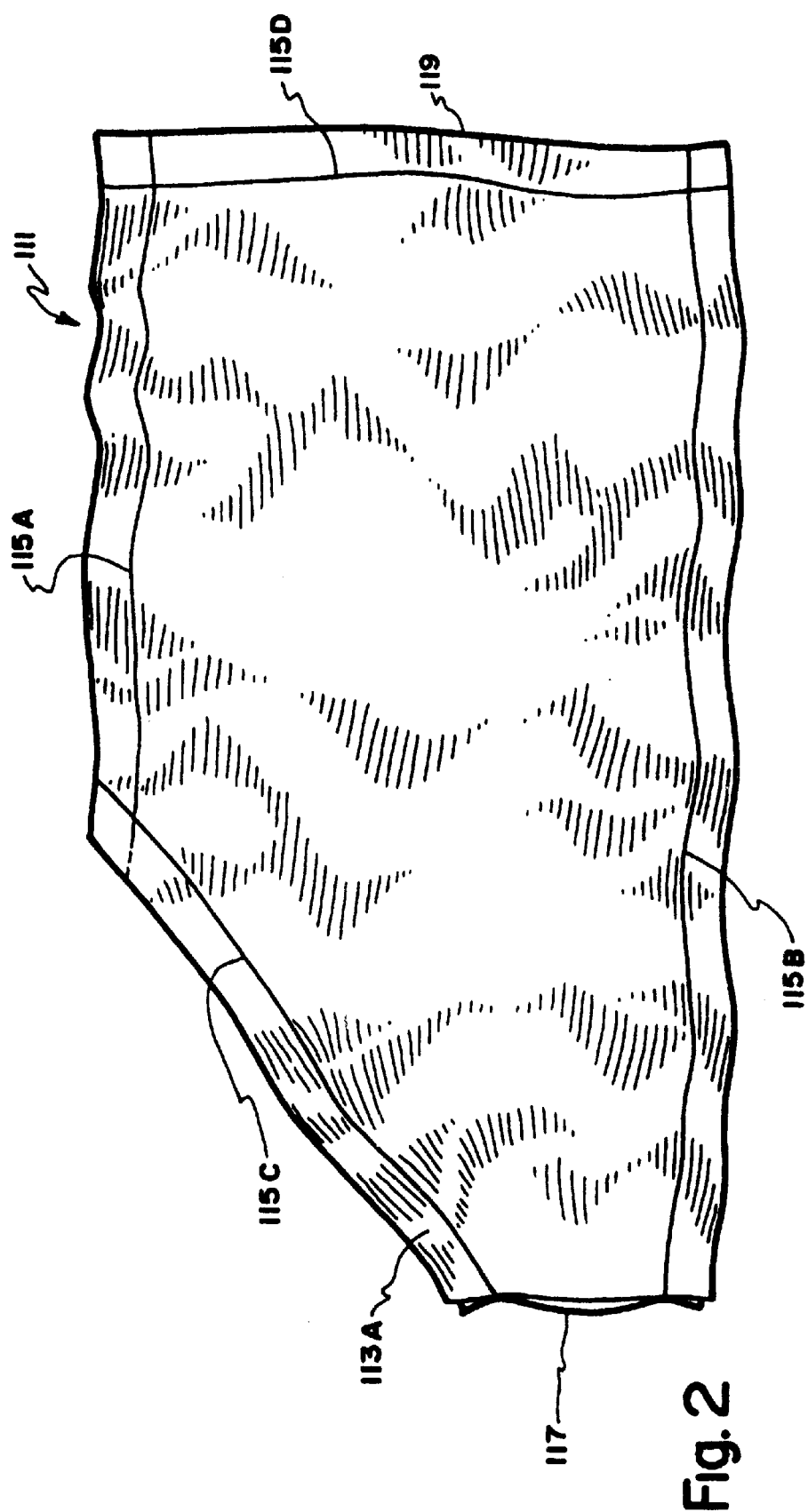
FIG. 2 is a schematic of an inflatable flexible bladder used in the process of the invention.
Figure 3:
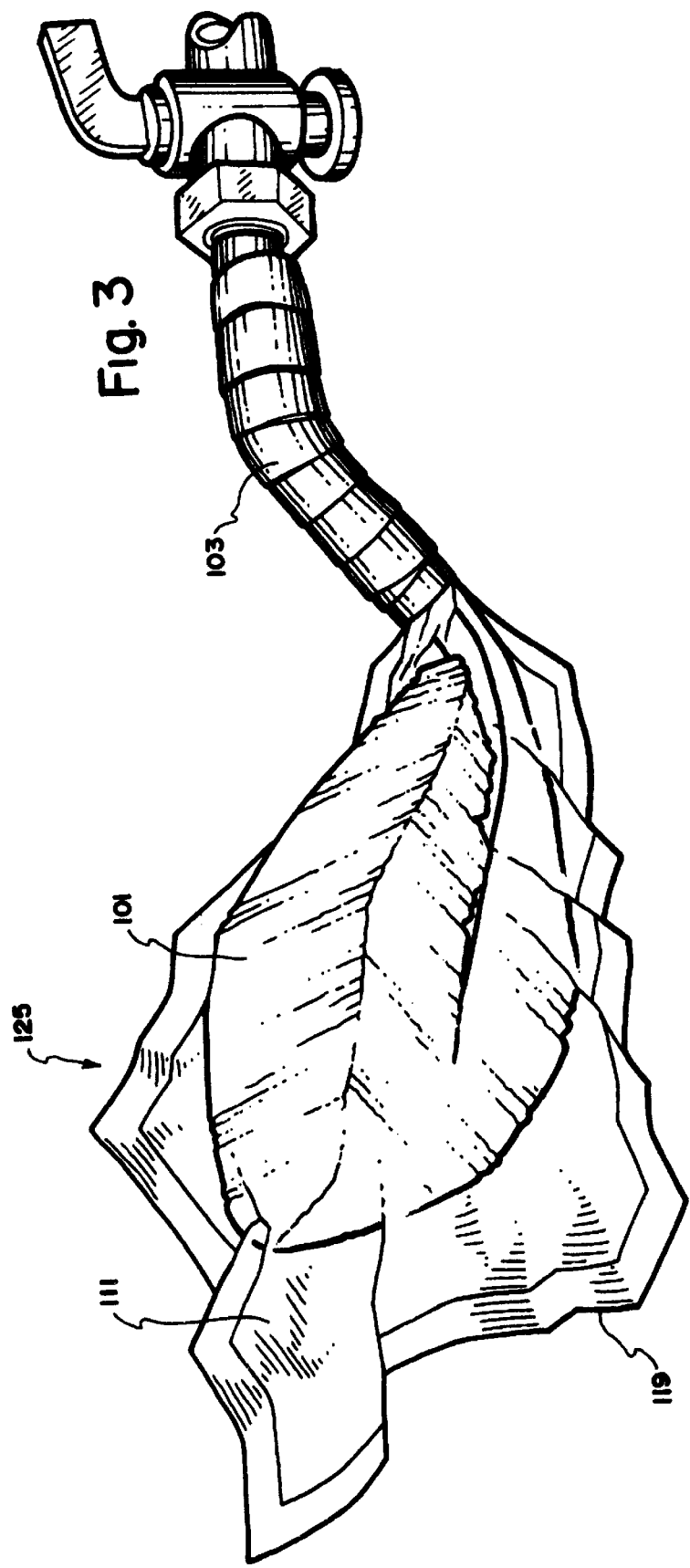
FIG. 3 is a perspective view of a core with inflation fitting as in FIG. 1 placed in a bladder as in FIG. 2 with a fitting for vacuum processing.

Referring to FIG. 2, a bladder 111 is formed by heat-sealing two plies of a heat sealable film with seals 115A, 115B, 115C. An opening 117 is provided for the inflation fitting, and an edge 119 (opposite the opening) is left unsealed until after insertion of the assembled inflation fitting and core, after which it is sealed with the final bladder seal 115D. FIG. 3 shows the core 101 with the completed inflation fitting 104 in the bladder 111 with the insertion edge 119 sealed. The bladder is sealed to the completed inflation fitting 104 by wrapping with the outer self vulcanizing rubber tape 1 09B (available from MOCAP, 10963 Lin-Valle Drive, St. Louis, Mo.) around the bladder where it overlays the silicon rubber tubular member 107. The silicone rubber material for the silicone member is Manufactured by Dow Coming, Midland, Mich. The inner surface of the bladder 111 at the opening 117 seals to the outside surface of the silicone member 107 during cure because the female mold 133 compresses the completed bladder inflation fitting 104, when the mold 133 is closed. The inside surface of the silicone member 107 also seals against the barbed fitting 143 when the mold 133 is closed. The outer wrap of self vulcanizing tape 109B protects the thin film bladder and keeps it in the bladder inflation cavity of the tool without pinching between the mold halves 133 when the mold is closed. It has been found that heat shrinkable polymer tubing will also serve this function.

The film bladder 111 shown in FIG. 2 is constructed from flat sheets of thermoplastic film which IS heat sealed together. The resultant bladder is considerably oversized. Alternatively, the same thermoplastic film is vacuum formed to form a premade three dimensional shape which has its edges located on a planar surface. These vacuum formed pieces are then heat sealed on the planar surface edges after the foam mandrel core 101 has been inserted. The resultant bladders are highly three dimensional in their free state, and their shape more closely follows the foam mandrel core 101. The foam mandrel core 101 is then also shaped more closely to follow the interior finished part shape, and the lay up process is simplified, for example a vacuum is not needed to pull a greatly oversized bladder 111 down on the foam mandrel core 101.

After the shape is suitably contained within the bladder 111 and the bladder sealed around the incomplete inflation fitting 103 thereby completing inflation fitting 104, air is drawn out of the interior of the bladder 111 by fixing a vacuum line and valve 123 to the completed inflation fitting 104. This allows the bladder 111 to conform with the shape of the core 101. The core/inflation fitting/bladder assembly 125 is then covered with one or more plies or layers of reinforcing fiber impregnated with a curable resin, commonly referred to in the industry as prepreg. Prepreg is available from many sources with a variety of resins and reinforcing fibers. In most applications, there are several plies, with placement of the plies and their fiber orientation according to design requirements of the club head. The fibers may be organic, or organically derived carbon or graphite fibers, or any other high strength/high modulus fibers.

FIG. 4 is a plan view showing an exemplary set of prepreg preforms. The preforms are all composed of laminates of unidirectional fiber prepreg and are fitted to be formed around a core. The numerical labels correspond to the order in which they are placed on the mandrel. The labels 50, 51, and 52 designate portions of the preforms that correspond to the hosel, face, and sole respectively. Suitable unidirectional carbon prepreg material is manufactured by Danutec Werkstoff GesmnH, Unz, Austria, and is available from Ciba Composites, 5115 East La Palma Ave., Anaheim, Calif. 92807 under the name Strafil C-M30SC-EP 1-130™. In Table I below, a description of each of the prepreg preforms is shown for items 1 to 18, including the number identifying the preform which is also the order of placement of the preform onto the mandrel. The table also describes the orientations of the fibers in each ply of the preform as well as the form of the fibers composing the preform. In general, the preforms are sized to cover about 60% of the total club head surface area. The darts, shown as slits, reduce the amount of wrinkling of prepreg material as it is placed on the core/inflation fitting/bladder assembly 125. However some small wrinkles are usually produced during wrapping and will disappear during the preform expansion and compaction in the molding process. The preforms are designed such that the number of ply terminations at any one location are minimized.

TABLE I

| Number | Description | Orientation | Material |
| --- | --- | --- | --- |
| 1 | Face-Sole | −45/+45 | Unidirectional |
| 2 | Face-Crown | 0/90 | Unidirectional |
| 3 | Face | 0/0/0/0 | Unidirectional |
| 4 | Face-Crown | −45/+45 | Unidirectional |
| 5 | Face-Sole | 0/90 | Unidirectional |
| 6 | Face-Crown | 0/90 | Unidirectional |

TABLE I-continued

| Number | Description | Orientation | Material |
| --- | --- | --- | --- |
| 7 | Face | −45/+45 | Unidirectional |
| 8 | Face | 0/−45/+45/90 | Unidirectional |
| 9 | Face-Sole | +45/−45 | Unidirectional |
| 10 | Sole | 0/−45/+45/0 | Unidirectional |
| 11 | Face-Crown | 90/0 | Unidirectional |
| 12 | Face-Crown | +45/−45 | Unidirectional |
| 13 | Face | 0/−45/+45/90 | Unidirectional |
| 14 | Face-Sole | −45/+45 | Unidirectional |
| 15 | Face-Crown | 90/0 | Unidirectional |
| 16 | Face-Sole | +45/−45 | Unidirectional |
| 17 | Face | 0//0/0/0 | Unidirectional |
| 18 | Face-Crown | 90/0 | Unidirectional |
| 19 | Face | +45/−45 | Cloth |
| 20 | Crown | +45/−45 | Cloth |
| 21 | Sole | +45/−45 | Cloth |
| 22 | Face-Crown | Random | Random Mat |
| 23 | Face | Random | Random Mat |
| 25 | Sole-Side | Random | Random Mat |

While the use of pre-impregnated carbon fiber is preferred, the invention may also be practiced by wrapping the foam mandrel core 101 with layers of fiber, and impregnating the fibers with resin before or after placement in the mold 133.

After the plies have been wrapped around the bladder 111 and the therein contained core 101 and inflation fitting 104, the assembly 131 is placed into a female mold 133. The bladder 111 is connected through its inflation fitting 104 to a pressurization line 144 by any suitable method, and the mold 133 is closed. The bladder 111 is inflated and pressurized to press the plies against the female mold 133, and the mold heated to cure the resin. The internal pressure of the bladder 111 is used to apply the compaction pressure of the fiber composite materials against the female tooling. Accordingly, the core 101 at this point has no further function. The interior molding surface of the female tooling 133 forms and defines the contours of the outer surfaces of the club head.

For visual appearance, an outer layer of fibers 145 may be placed around the wrapped core assembly 131 or in the female mold 133 before placement of the assembly into the mold 133. This outer layer then forms the outer layer of the club head and provides surface appearance. Preferably this outer layer is a cosmetically appealing material such as woven carbon fiber material. Outer structural or non-structural layers may also be placed in the mold, before or after placement of the core/bladder/prepreg assembly 131 in mold, rather than wrapping the plies around the core/bladder/fiber assembly 131.

Figure 11:
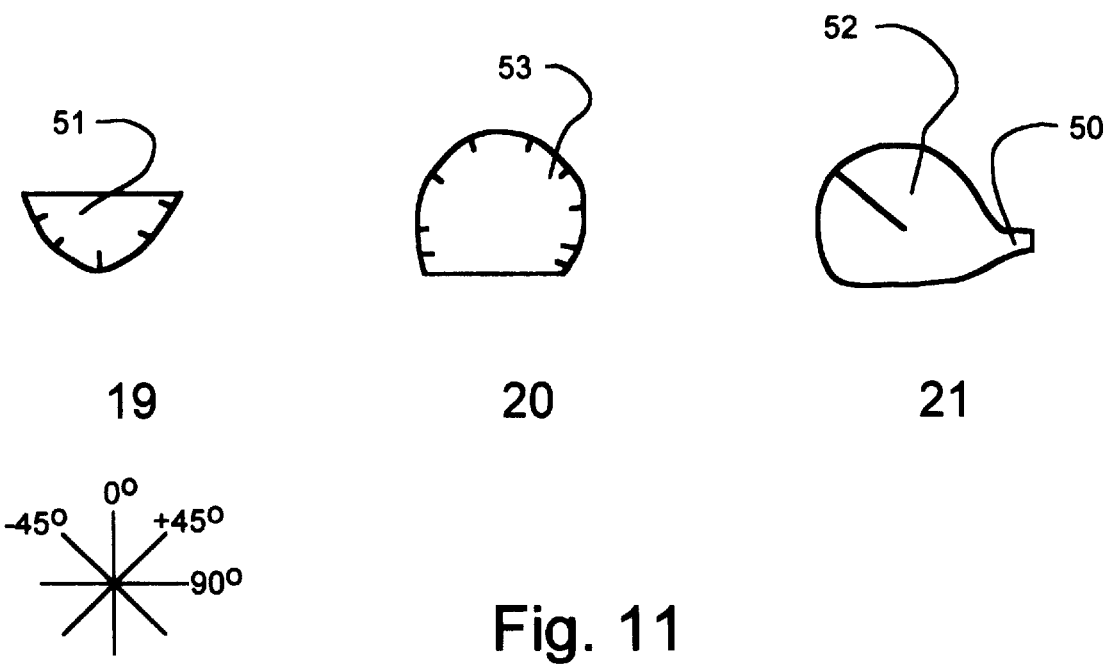
FIG. 11 is a plan view of a set of tool prepreg plies which may be used in the manufacture of a club head by the process of the invention.

FIG. 11, and items 19 to 21 illustrate a set of fiber plies used to form the outer surface of the club head. All have a +45/−45 fiber orientation in the form of a woven cloth. Ply 19 covers the face. Ply 20 covers the crown. Ply 21 covers the sole. In the illustrated embodiment, plies 19 and 20 are placed on the assembly and ply number 21 is placed in the tool. Suitable woven cloth material is available from Ciba Composites, 5115 East La Palma Ave., Anaheim, Calif. 92807.

The bladder 111 is pressurized with a fluid, gas or liquid, preferably air, with a suitable pressure source located outside of the mold 133. Thus, application of pressure to the composite during cure is not dependent upon expansion of a foaming core material or the strength properties of the core. The core 101 in the present invention serves essentially as a mandrel for the initial lay-up of the prepreg plies and has no function once the molding starts. Because of dimensions of the mandrel core 101, the fiber plies before the molding step approximate the shape of the final part, so movement of the plies during inflation of the bladder 111 is minimized.

The timing of the pressure application 201, the amount of pressure, and timing and extent of the heating of the mold to curing temperature 200 can be optimized by suitable process controllers to produce the desired results. The composite should be fully expanded by the inflatable bladder 111 to the mold walls to form a well-compacted, high-fiber-content, low-void-content laminate. The pressure may be cycled, or pulsed 202 to produce this result.

The bladder pressure 201 is generally between 200 to 250 psig. However, higher and lower pressures may be used to fit design requirements, and the equipment design limitations. The mold is heated to the temperature 200 required to cure the resin being used.

In order to remove air from the mold 133 that may cause voids in the final part, a vacuum 203 is preferably applied to the mold cavity via a special port in the tool before and during the time the bladder 111 is inflated and the mold 133 is heated. A vacuum seal is obtained by use of an "O"-ring inside a mold "O"-ring vacuum groove 146. To assist in the evacuation of air trapped in the wrapped bladder/core 131, porous materials 129 may be placed between carbon fiber prepreg layers to provide flow paths for air within the wrapped assembly 131 to the vacuum port 150 in the mold. These porous materials 129 can be placed between the layers, e.g., under the last layer placed over the core/bladder assembly 131, or over the last structural plies over the core and under the outer-surface decorative plies 145. The mold is preferably provided with a separate vacuum port 150, with the shape and orientation of the porous material 129 designed to assist passage of gas to the vacuum port from distal areas of the part. The porous material may be any suitable material, preferably one that can be incorporated into the molded part with little or no effect on physical properties or cosmetic appearance, such as an unimpregnated carbon fiber felt material 129. In FIG. 5, and items 22 to 24 in Table I, is illustrated a set of carbon fiber random mats 129 to be used with the plies shown in FIGS. 4 and 11. The label 53 designates portions of the plies that correspond to the crown or top of the finished head 206. Suitable random mat 129 material is available from Fiberite Inc., 2055 E. Technology Cir., Tempe, Ariz. 85284.

Figure 6:
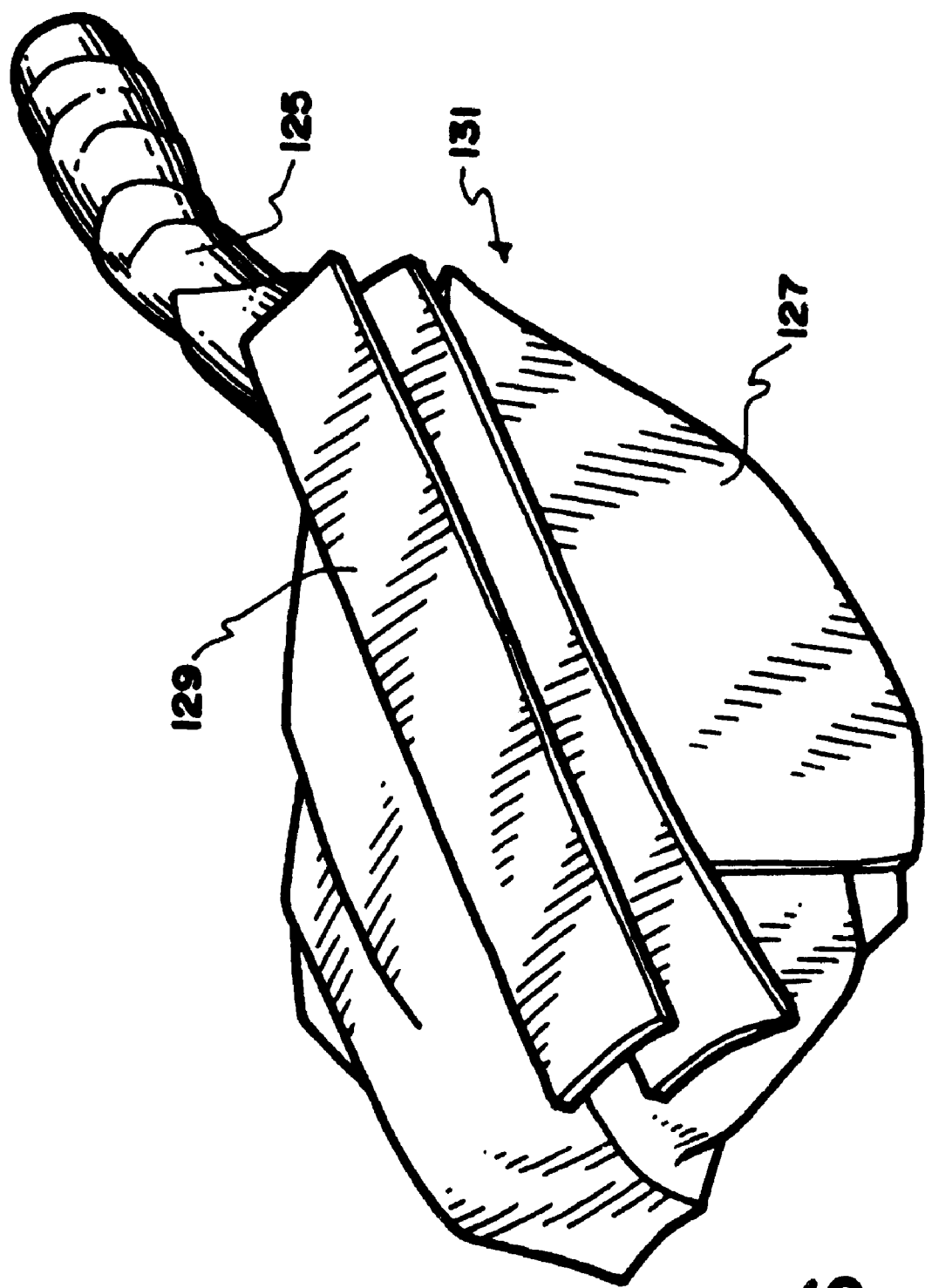
FIG. 6 is a perspective view of a bladder/core assembly as in FIG. 3 wrapped with plies as in FIGS. 4 and with mats as in FIG. 5.

Referring specifically to FIG. 6, which shows a core/bladder assembly 125 wrapped in prepreg plies 127. Unimpregnated carbon felt mats 129 are placed over the plies. It has been found that in some instances the dry fiber mat material 129 is not needed for removal of entrapped air, such as if the mold contains features to allow resin flow in critical corner areas. In one particular case a small channel or groove, about 0.020" deep and 0.020" wide, was added to vent the mold part cavity at the club head face to club head crown location, to provide a path for resin flow towards the vacuum port 150.

Figure 7:
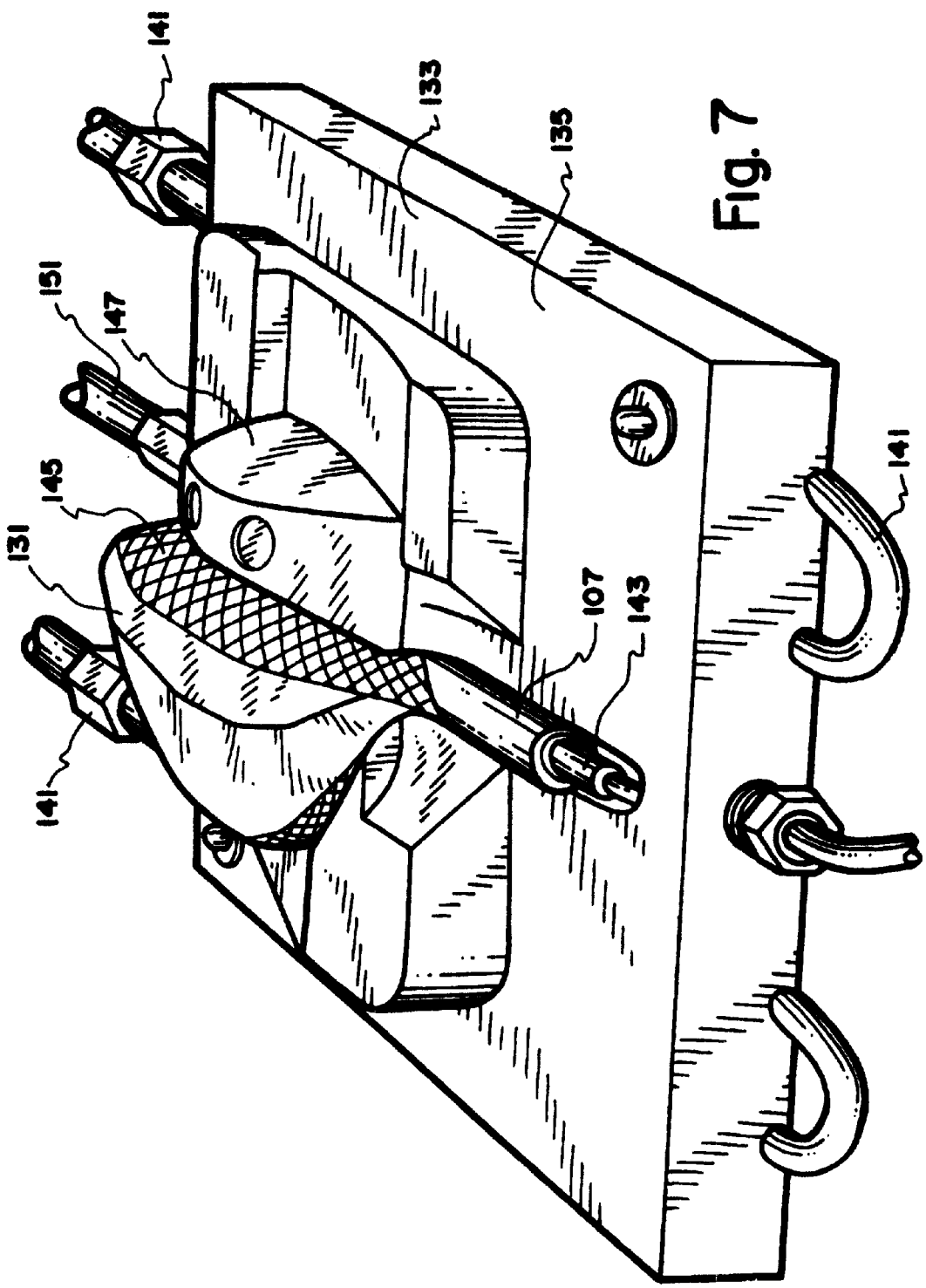
FIG. 7 is a perspective view of a top half of the female mold in which the wrapped assembly in FIG. 6 is placed for the molding process.
Figure 8:
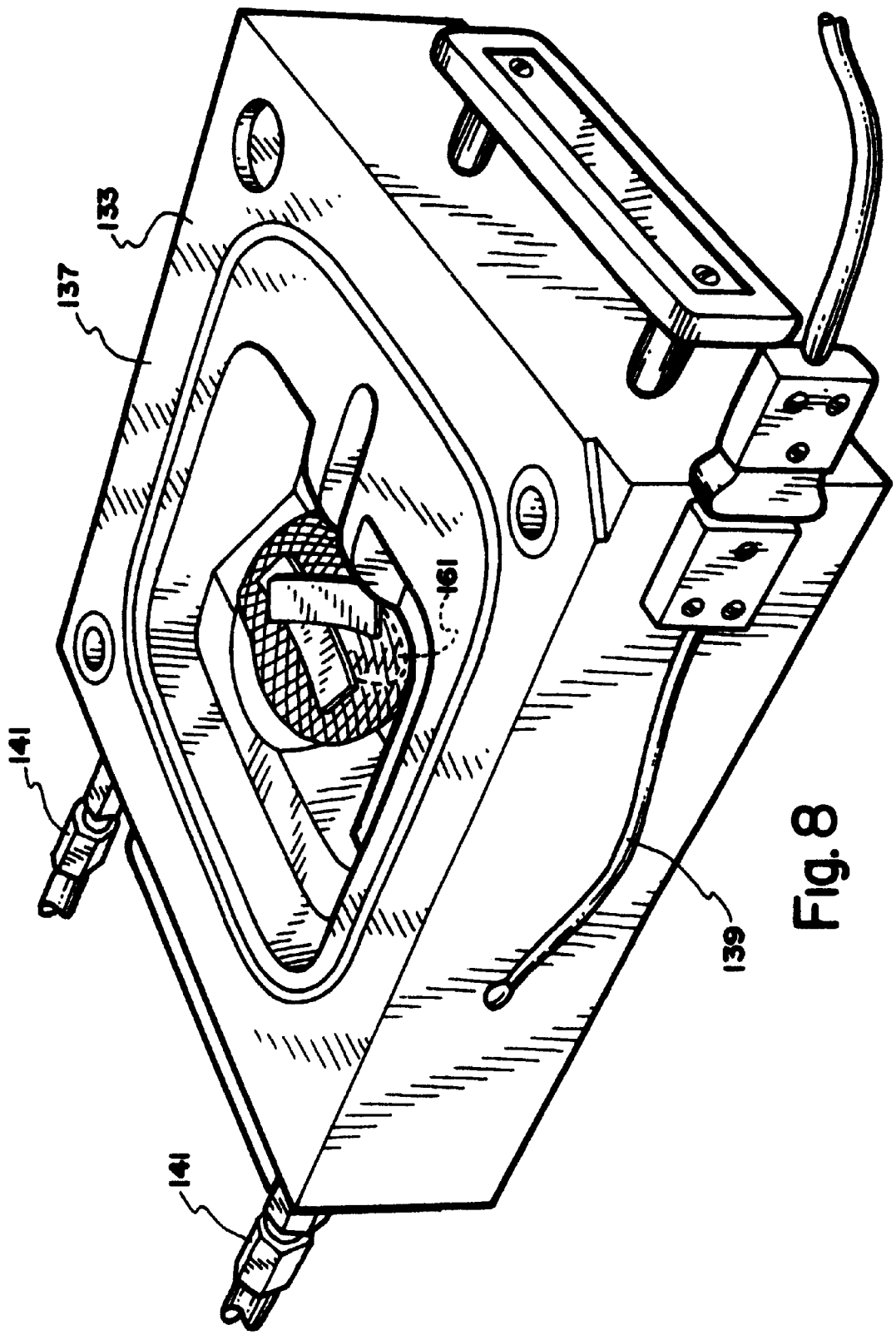
FIG. 8 shows the bottom half a female mold to match the top mold half in FIG. 7.

Referring to FIG. 7 and FIG. 8, the wrapped assembly 131 of FIG. 6 along with the tool prepreg plies 145 shown in FIG. 11 plies 19 and 20, is placed into a top half 135 of a female mold 133. The bottom half 137 of the mold is shown in FIG. 8 with the remaining tool prepreg ply shown in FIG. 11 as ply 21, the random mats 129 and the additional weight 161 shown in phantom. These tool prepreg plies 145 are usually a woven prepreg cloth and function mainly to provide a pleasing appearance to the outer surface of the final molded part. The mold 133 includes thermocouple connections 139 for controlled heating of the mold to cure temperatures, and cooling lines 141 for passage of cooling water to cool the mold. A tubular barbed fitting 143 for insertion into the tubular silicon member 107 of the completed inflation fitting 104 is also provided. The mold match pins 134 provide precise alignment of the top 135 and bottom 137 mold halves. The handle 136 allows mold handling.

The completed inflation fitting 104 is attached to an inflation line 144 by means of the barbed fitting 143. The removable mold insert 147 which forms the club head face is also attached. This insert 147 may be required to ease removal of the molded part from the mold, depending upon the complexity of the shape of the molded part. The mold insert 147 is mainly needed if the grooves on the face of the club are molded in. Another alternative, which is preferable in some ways, is to route the grooves on the face after the club head has been molded. If the grooves are not molded, then the third mold piece is not needed.

The core 101 is dimensioned such that the wrapped core/bladder assembly 131 is dimensioned smaller than the inner dimensions of the mold 133, compensating for any fiber layers or other inserts placed in the mold before the wrapped core/bladder assembly. The core 101 dimensions should allow the mold 133 to be closed without fibers from the wrapped assembly being caught between sections of the mold and extruded outside of the part cavity during molding. The core 101 dimensions are preferably as large a practical, in order to permit a minimum of movement of the composite when the bladder 111 is inflated. This is to discourage wrinkling or off-axis movement of any fibers in the plies. In an exemplary application, the core outer dimensions are between about 65% and 85% of the inside dimensions of the female mold cavity (or of the final molded part).

Figure 9:
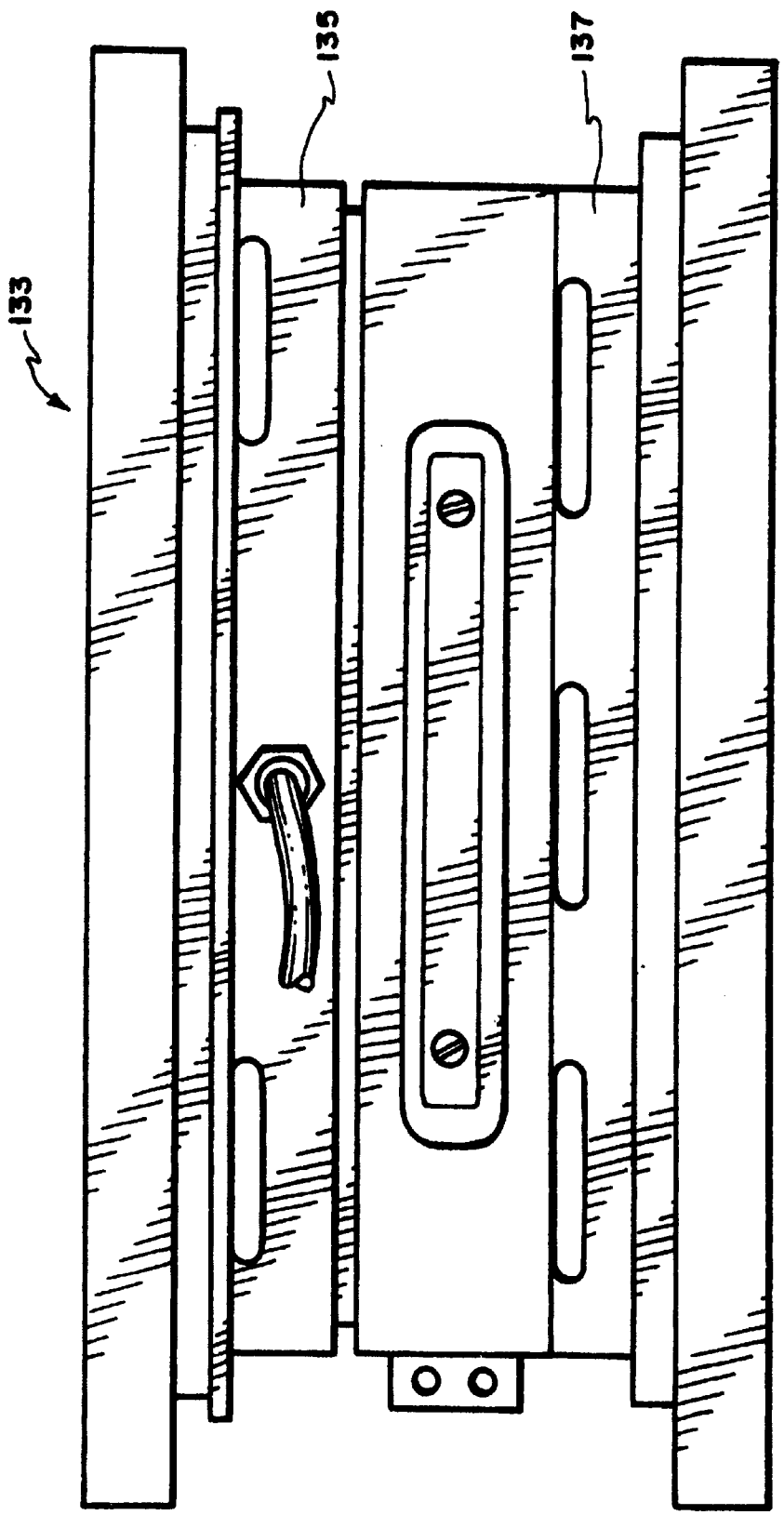
FIG. 9 is a schematic view of a closed mold sandwiched between the heating platens.

FIG. 9 shows the bottom and top of the mold 133 together press molding heating platens 132 and platen insulation 138. The mold 133 is placed in a suitable press and connected to suitable lines for vacuum 150, pressurization 144, cooling 141. The press provides clamping force to the mold to maintain the mold 133 closed against the internal molding pressure 201, 202 of the bladder 111. Mold heating platens 132 are mounted in the press along with the platen insulation 138. Before the curing of the part is begun, a vacuum is drawn on the cavity through vacuum line 150.

Figure 12:
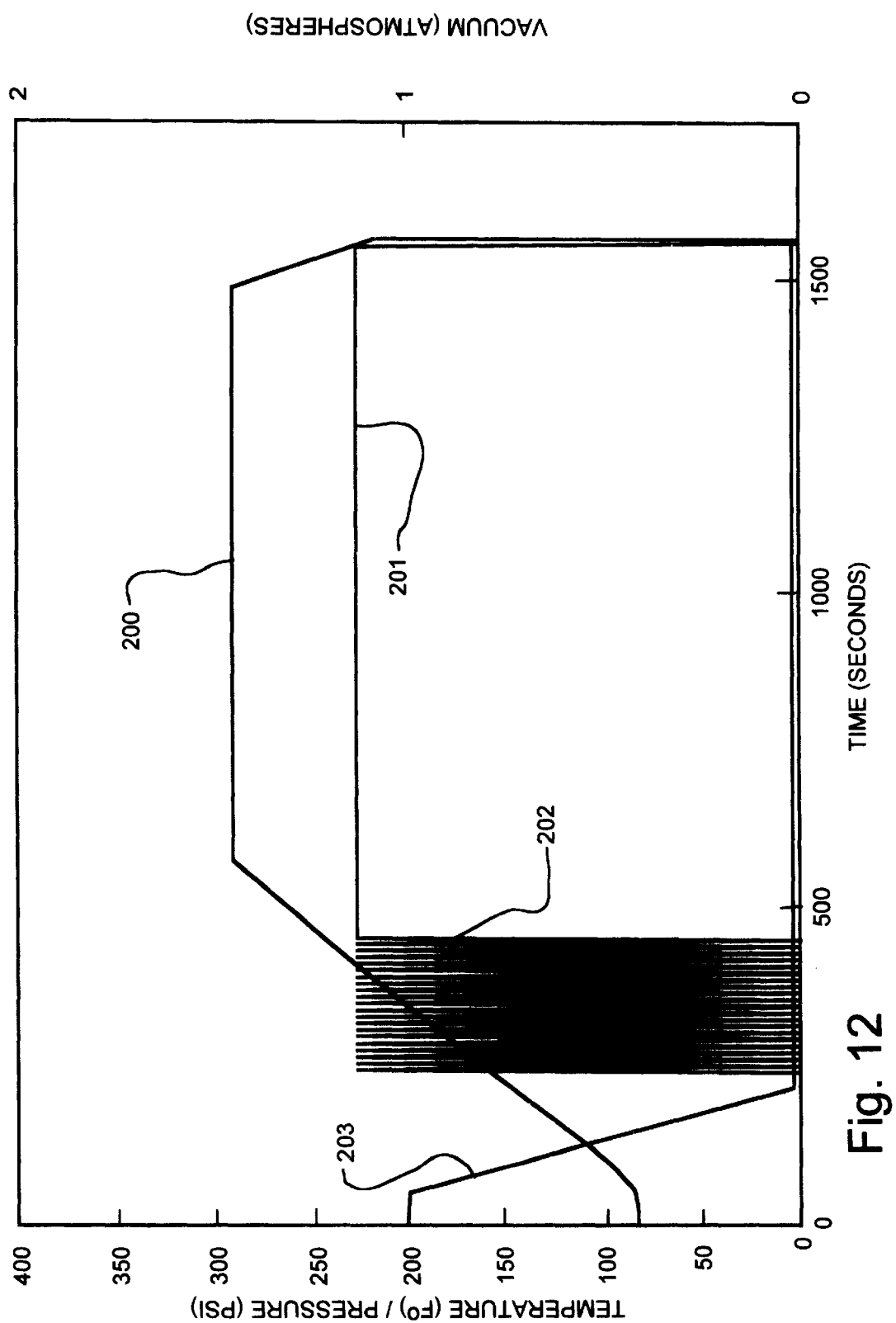
FIG. 12 is graph showing process condition during molding of a club head.

FIG. 12 is a graph showing the process condition during a molding cycle. The line 201 shows the bladder pressure during molding. The line 202 shows the segment of the cure cycle where the bladder pressure is pulsed. Line 200 shows the temperature of the mold in degrees Fahrenheit. Line 203 is the vacuum being drawn on the tool mold cavity, shown in atmospheres. In the example the bladder pressure 202 was pulsed between 0 and 250 psig to hammer the prepreg plies into conformation with the female tooling.

Cure cycles have been successfully used where the mold temperature is held constant at the full cure temperature. The mold 133 is continuously heated to its set full cure temperature, typically 300 degrees Fahrenheit. The uncured fiber resin club head containing the bladder/core/fitting 125 is placed in hot mold, the bladder inflation fitting 104 is connected to the barbed fitting 143 in the mold, the mold is closed and the bladder pulsing starts immediately. The mold 133 is removed from the clamping press and opened without any previous cooling. The cured club head is removed from the mold while the mold is still hot. The mold cleaning operation, and mold release operations are also performed on the hot mold. This cure cycle reduces the molding time considerably.

Figure 14:
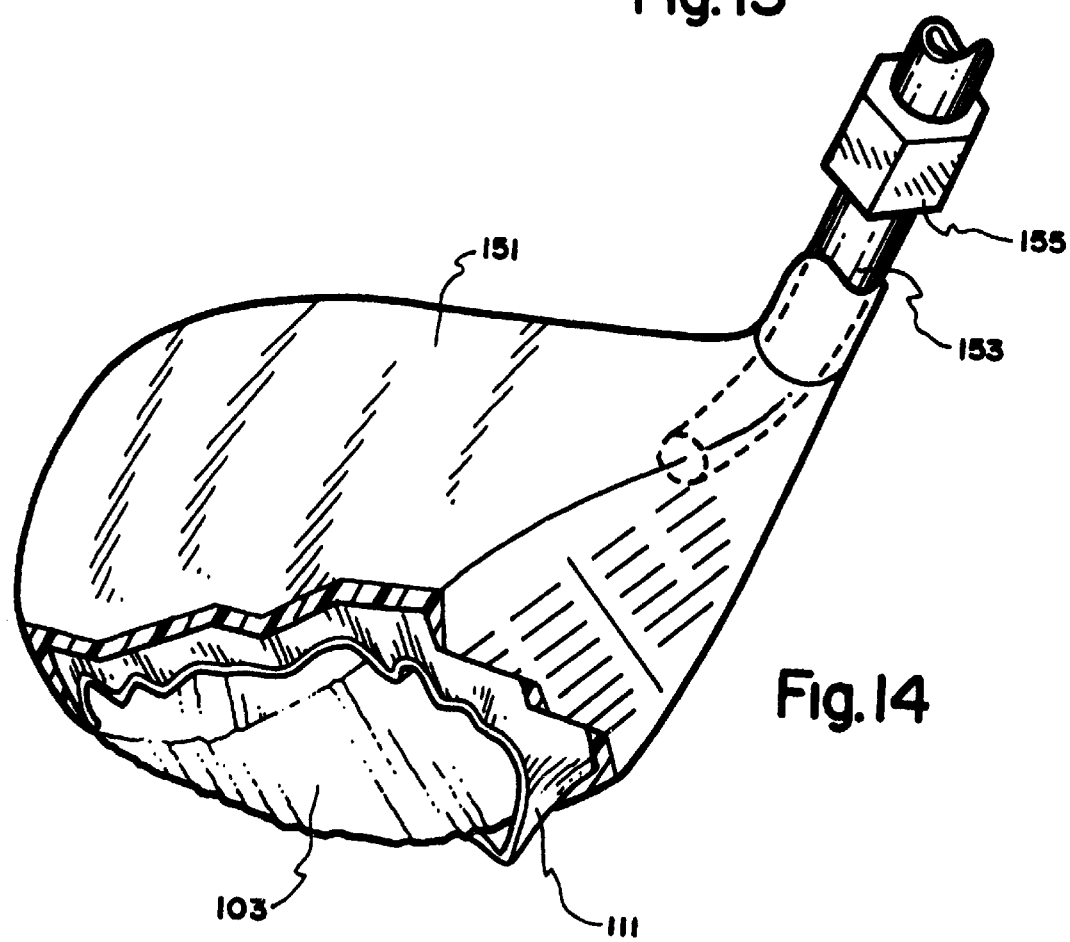
FIG. 14 is a perspective view of the molded article in partial cross-section, with a soluble core and the bladder in the interior and the fitting used to introduce solvent to dissolve and flush out the core material.

After the resin is cured, the bladder 111 is depressurized, the part removed from the mold 133, and the inflation fitting 104 is removed from the part. It is not desirable to leave the bladder 111 and core 101 within the molded club head, so both are removed after molding. The core 101 is removed by injecting water into the bladder to dissolve it. As shown in FIG. 14, a water injection fitting 205 may be inserted through the opening in the bladder left after removal of the inflation fitting 104. The water may be heated or contain suitable additives, dispersants, or the like, to assist in dissolving and dispersing the core material. Any liquid or gaseous material, such as a solvent or a reactive material that causes disintegration of the solid core by, for example, by solvation, chemical reaction, or the like, sufficient to allow removal of the bladder is contemplated by the invention.

Figure 15:
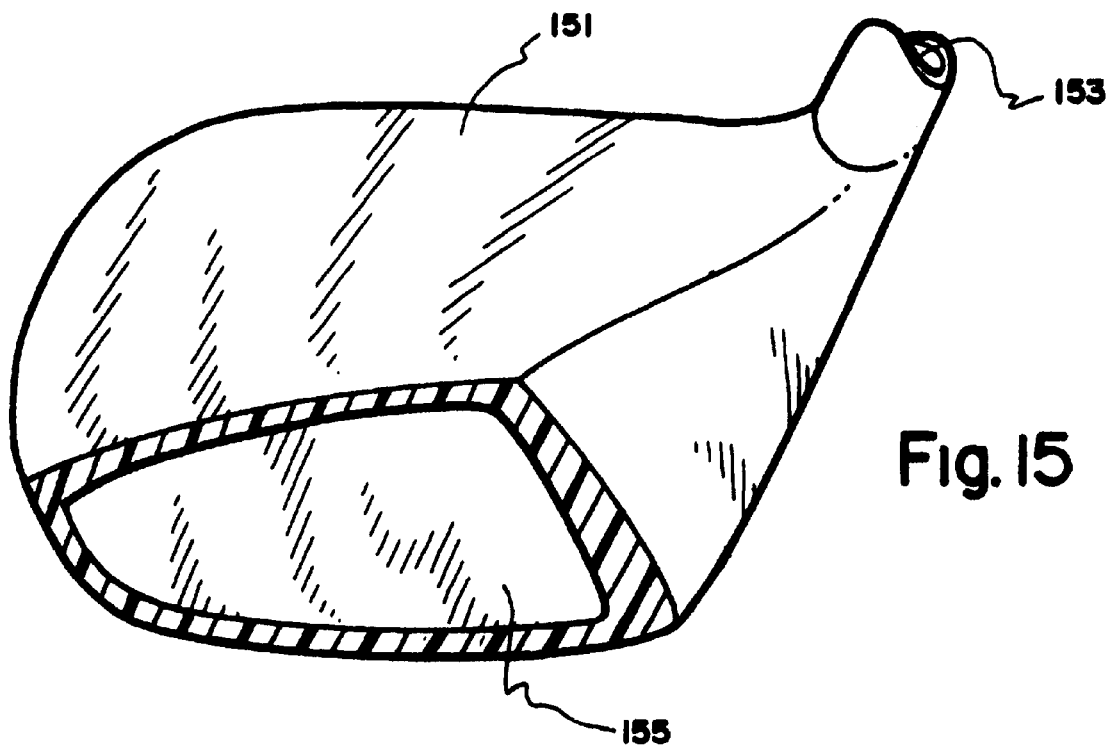
FIG. 15 is a cross-sectional view of a molded article with the soluble core and the inflatable bladder removed.
Figure 16:
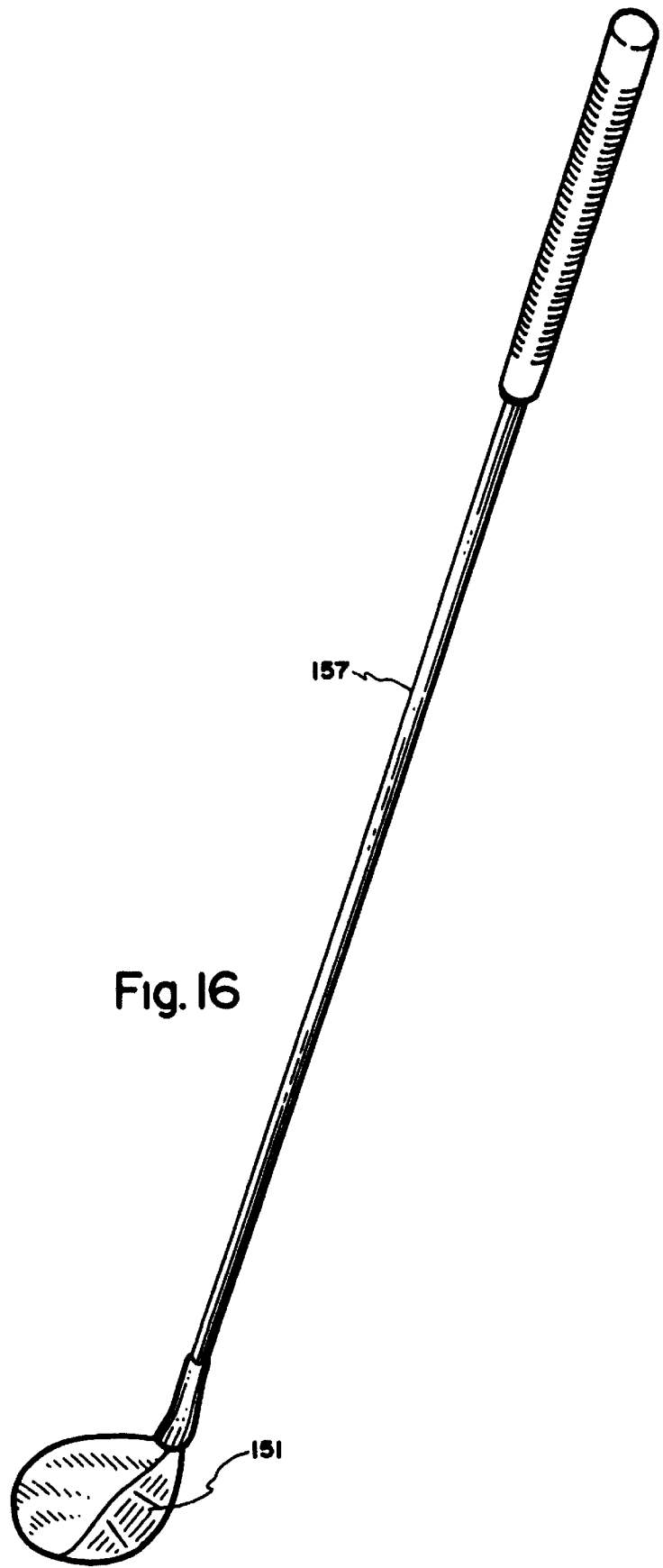
FIG. 16 is perspective view of club head manufactured according to the process of the invention mounted on a golf-club shaft.

After the core 101 is removed by dissolving, the bladder 111 is easily removed by pulling it out through the hole 153 through which the inflation fitting extended 104. If the bladder is of a water-soluble material, it may also be fully or partially dissolved when the core is removed. As shown in FIG. 15, the final molded part 151 is generally hollow with at least one opening or hole through which the bladder opened and the inflation fitting originally extended. This would typically be the upper hosel hole 153 in the club head. The shape may also have additional openings if desired. Since the final shape is a golf club head, the shape is preferably configured such that the opening corresponds to the opening of the hosel 153 for attachment of a golf-club shaft 157 as shown in FIG. 16. The club head interior 155 is essentially free of any of the molding materials, e.g., core 101 or core residues, and the bladder 111 or bladder residues. The only remaining components of the final club head are structural elements, i.e., the reinforced fiber composite, and any inserts, such as weights, plates and the like, that have function in the final molded part. There are essentially no materials that are remnants of the molding process and have no function in the final club head, but often add undesirable weight to the club head.

Figure 13:
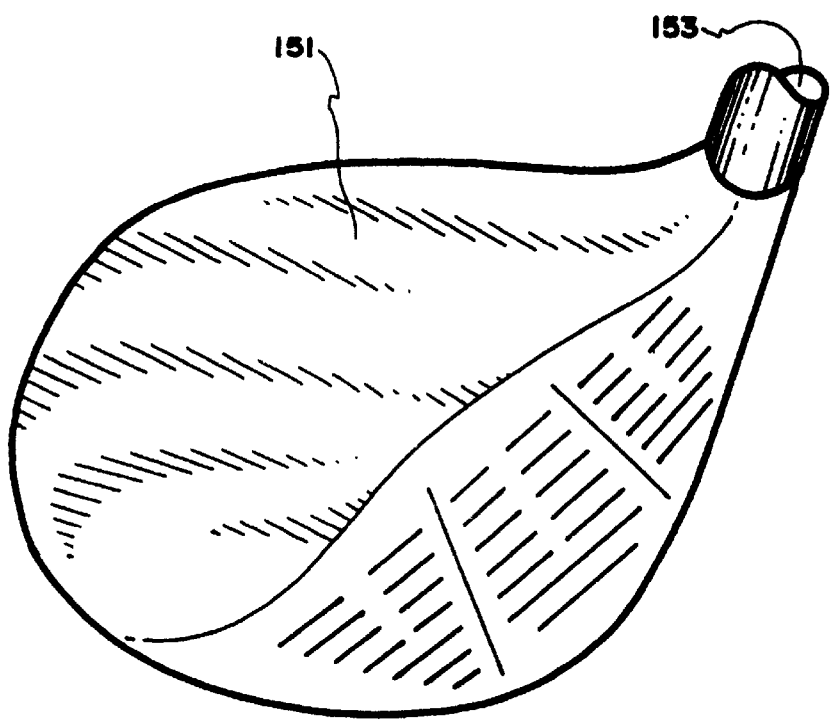
FIG. 13 is a perspective view of the molded club head article after removal from the mold and removal of the bladder, core and inflation fitting.

Referring to FIG. 13, which shows the molded part 151 in the form a golf-club head after it is removed from the mold and the inflation fitting 104 that extended from the hosel hole 153 is removed.

Referring to FIG. 14, the molded part 151 is shown in partial cross-section showing the core 101 and the bladder 111 remaining in the interior. A water injection fitting has been inserted through the hole so that pressurized water can be injected into the interior. The water dissolves the core, and the bladder is pulled out through the hole 153. The result, shown in cross-section in FIG. 15, is a molded part with a hollow interior 155 that is free of the bladder or any of the materials used for molding the part. The molded part 151 may then be mounted upon a golf club shaft 157 by any suitable manner as shown in FIG. 16.

Figure 10:
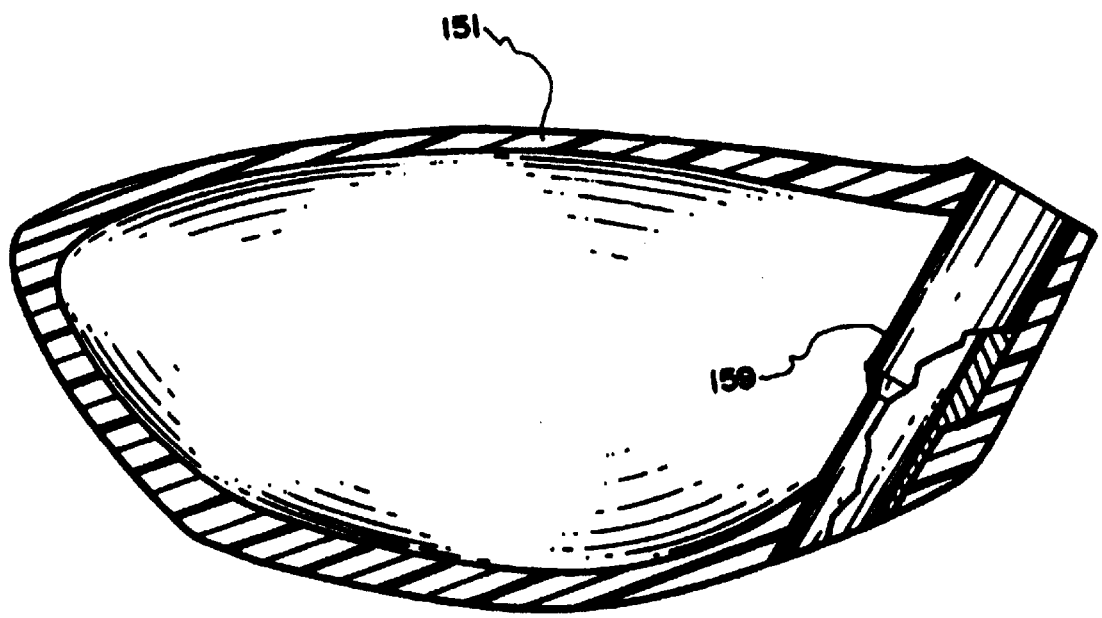
FIG. 10 is a cross-sectional view of a molded article showing in phantom a reinforcing tube for shaft bonding.

Referring to FIG. 10, which shows a molded club head 151. Shown in phantom is an optional interior club head shaft attachment sleeve 159 that is inserted through the upper hosel hole 153 and aligned with a bottom hosel hole 163 in the sole. The sleeve 159 is bonded into the finished and trimmed club head 206. The sleeve 159 is dimensioned and aligned for receiving the golf club shaft 157. The golf club shaft, which may be any suitable material such as metal or fiber composite, is bonded to the head by any suitable process.

The final molded and trimmed part 206 may also include inserts or implants that are incorporated into the part during the curing. These may include face plates, tubular members for receiving a shaft, weights, etc. The inserts may be uncured, partially cured, or cured composite materials, metals, or any other materials compatible with the molding process, and able to bond or be held in the cured fiber-reinforced resin. As an example, a partially cured or uncured resin mixed with a metal powder may be placed into the mold with the wrapped shape, or placed between plies of the prepreg. The insert and the plies are then co-cured together to form an integral part. The part may also include molded holes, ridges, or other shapes for mounting of face-plates, labels, and the like.

Figure 17:
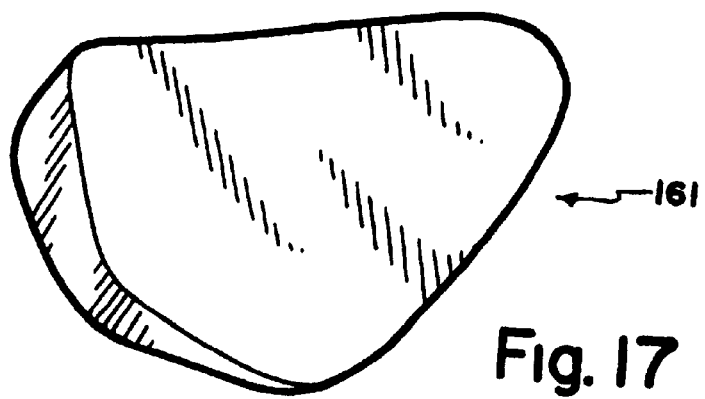
FIG. 17 is a perspective view of an optional weight that may be placed in the mold with the wrapped assembly to become an integral part of the final cured club head.

Referring to FIGS. 8 and 17, an insert 161 is placed in the bottom mold 137 as shown in phantom in FIG. 8, before the mold is closed. In the illustration, the insert 161 is a weight that will be positioned in the sole of the female mold. The insert 161 may be any suitable weighting material that can become incorporated into the cured part. The insert may alternately be place between or under prepreg plies. The insert illustrated is a metal powder, tungsten, in a cured thermosetting matrix. FIG. 17 is a detail view of the insert 161. The metal powder imparts the weight and a pleasing appearance to the surface of the insert 161, as it will be at the outer surface of the club head. Tungsten is preferred because of its density, but other powders may be used to vary the mass and appearance of the insert, such as copper, brass, or mixture or the same.

Optionally, stainless steel shells have been investment cast, generally covering the sole area, or perhaps the sole and club head face. These inserts can be then be placed amongst the prepreg plies during lay up, and become an integral part of the club head, adding weight where needed, and also beneficially influencing the aural qualities of the club head experienced shortly after ball impact.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

BRIEF SUMMARY DESCRIPTION OF THE PROCESS STEPS

A summary of the steps for one of the preferred methods for producing golf club heads of this invention are listed below:

| Step | Description |
| --- | --- |
| 1. | Form a foam mandrel core which is used inside bladder for material arrangement process. |
| 2. | Form and seal a bladder around the mandrel core and attach a bladder inflation fitting to the bladder to create the bladder/core/fitting assembly. |
| 3. | Place uncured fiber resin prepreg material on bladder/core/fitting assembly. |
| 4. | Place uncured fiber resin prepreg club head containing bladder/core/fitting assembly into a female mold defining the final outer contours of the club head. |
| 5. | Apply pressure into bladder to compact uncured fiber resin prepreg club head while applying vacuum in mold cavity to remove entrapped air and heating mold and club head to harden or cure the plastic resin. |
| 6. | Remove cured club head, which still contains the bladder/core/fitting assembly, from the female mold. |
| 7. | Remove the bladder inflation fitting from the bladder/core/fitting assembly. |

-continued

| Step | Description |
|---|---|
| 8. | Introduce water into bladder/core, which is still inside cured club head, to wash out the foam mandrel core from inside the bladder. |
| 9. | Remove the bladder from inside the cured club head, by pulling it out of hosel hole (this is the top hosel hole, the only opening in the as molded club head). |
| 10. | Trim the excess cured composite material from around area where bladder enters club head (i.e. the top hosel hole) and drill a hole through the club head top hosel hole creating a bonding surface for the interior shaft attachment, and also forming the bottom hosel hole. |
| 11. | Insert and bond the interior shaft attachment sleeve inside the cured club head. |
| 12. | Club head is now ready for bonding to golf shaft. |

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

The present invention is suitable for the manufacture of a wide range of hollow composite components. It is particularly well suited for complex three dimensional composite material structural components having at least one opening to allow use of the method of the invention using the bladder, to allow removal of the bladder from the part. The following parts may be suitably made by the process of the invention, bicycle frames,
bicycle frame components such as lugs or tubes,
bicycle components, such as handlebar stems, cranks, brake components, wheels, hubs forks, suspension forks,
musical instruments such as guitars, violins, violin bows, cellos, basses, clarinets, trumpets, etc.
aircraft components, such as flaps, spoilers, ailerons, seat frames, window frames, access doors, etc.
automobile components, such as seat frames, suspension components (link arms, etc.)
complex, multiply curved, three dimensional shapes,
hollow thin walled shapes where having more than one or two plies terminating at any one location would be detrimental. The method is particularly suitable to eliminate the gross fiber discontinuity, for example between two symmetric part halves which occurs in some prior art applications of bladder molding composites.
parts with multiple hollow cells connected by small openings, such as aircraft control surfaces with shear ribs and panels breaking up longer torsion boxes.

What is claimed is:

1. A process for manufacturing a golf-club head comprising;
   shaping a fluid-removable core in the general form of the club head,
   placing the core into a flexible, pressurizable bladder formed of thin thermoplastic film,
   wrapping over the assembly of core and bladder at least one ply of fiber impregnated with a curable resin,
   placing the assembly of core, bladder, and impregnated fiber into a female mold,
   forming a cured part in the form of a golf-club head by pressurizing the bladder to force the plies against inner surfaces of the mold and heating the mold to cure the resin,
   removing the cured part from the mold,
   injecting a fluid through a hole into the interior of the part to disintegrate the fluid-removable core sufficient to allow removal of the bladder from the interior of the cured part through a hole in the cured part,
   removing the bladder and any solid residues of the core through the hole to form a hollow molded club head with a hollow interior.

2. The process of claim 1 wherein the fluid is liquid and the fluid-removable core comprises a material that is soluble in the fluid.

3. The process of claim 2 wherein the core comprises a water-soluble starch and the fluid is water.

4. The process of claim 1 wherein thin thermoplastic film comprises a halohydrocarbon.

5. The process of claim 2 wherein the fluid is water and the fluid removable core comprises a material that is soluble in water.

6. The process of claim 5 wherein the thin thermoplastic film comprises a polyvinyl alcohol film.

7. The process of claim 1 wherein the fluid-removable core includes structure corresponding to the hosel of the head and an inflation fitting is disposed relative to said structure whereby the inflation fitting is used to pressurize the bladder during curing of the part, and when the inflation fitting is removed it leaves a hole into the interior of the cured part, which is the hole through which solvent is introduced into the interior of the bladder and through which the bladder is removed, the hole being the hole through which a golf shaft is inserted.

8. The process of claim 1 wherein two thin thermoplastic sheets are joined by heat sealing to form the pressurizable bladder.

9. The process of claim 8 wherein the two thin thermoplastic sheets are vacuum-formed to conform the bladder to the shape of the core.

10. A method for forming a hollow fiber composite golf club head, the method comprising;
    placing a mandrel core of a solvent-soluble material into a flexible, pressurizable bladder formed of thin thermoplastic film to form a bladder/core assembly,
    wrapping resin impregnated reinforcing fiber around the bladder/core assembly,
    placing the wrapped bladder/core assembly into a female mold,
    pressurizing the bladder in the female mold to compact the reinforcing fiber against inner surfaces of the mold and heating the mold to cure the resin to form a cured part, such that compaction of the fiber against the mold is predominantly from the bladder pressurization and no compaction is from the mandrel core,
    injecting a solvent that dissolves the solvent-soluble material into the interior of the bladder to dissolve and remove sufficient core material to allow removal of the bladder from the interior of the cured part, and
    removing the bladder from the interior of the cured part after removal of the dissolved core material.

11. The method of claim 10 wherein the solvent is water and the solvent-soluble material of the core comprises a water-soluble material.

12. The method of claim 11 wherein the thin thermoplastic film comprises a water-soluble film that is at least partially solubilized when the water is introduced into the interior of the bladder.

13. The method of claim 10 wherein the bladder is removed by pulling the bladder out through a hole in the cured part through which the solvent is injected.

14. The process of claim 10 wherein two thin thermoplastic sheets are joined by heat sealing to form the pressurizable bladder.

15. The process of claim 14 wherein the two thin thermoplastic sheets are vacuum-formed to conform the bladder to the shape of the core.

16. A method for forming a golf club head comprising:

forming a mandrel core of a fluid removable material;

fixing an inflation fitting to the mandrel core;

placing the mandrel core into a flexible, pressurizable bladder formed of thin thermoplastic film with the inflation fitting extending out of an open end of the bladder, the bladder comprising thin thermoplastic sheets;

wrapping at least one ply of resin impregnated fiber around the bladder;

placing the wrapped bladder containing the mandrel core into a female tooling with the inflation fitting connected to a source of pressurized fluid;

directing the pressurized fluid through the inflation fitting to pressurize the bladder and compact the resin impregnated fiber against inner surfaces of the female tooling and heating the mold to form a cured part with outer dimensions corresponding to the female tooling and a hole through which the inflation fitting extends;

removing the cured part from the mold and removing the inflation fitting from the cured part;

injecting fluid into the interior of the bladder through the hole to disintegrate and remove the mandrel core enough to allow removal of the bladder through the hole through which the inflation fitting extended; and removing the bladder through the hole.

17. The process of claim 16 wherein two thin thermoplastic sheets are joined by heat sealing to form the pressurizable bladder.

18. The process of claim 17 wherein the two thin thermoplastic sheets are vacuum-formed to conform the bladder to the shape of the core.

19. A method for forming a hollow complex-three-dimensional fiber composite shape having at least one hole, the method comprising;

placing a mandrel core of a fluid-removable material in a flexible, pressurizable bladder formed of thin thermoplastic film to form a bladder/core assembly, the bladder comprising thin flexible thermoplastic sheets, wrapping resin impregnated reinforcing fiber around the bladder/core assembly, placing the wrapped bladder/core assembly in a female mold, pressurizing the bladder in the female mold to compact the reinforcing fiber against inner surfaces of the mold and heating the mold to cure the resin to form a cured part, such that compaction of the fiber against the mold is predominantly from the bladder pressurization and not from the mandrel core, injecting solvent into the interior of the bladder through the at least one hole to disintegrate and remove core material to allow removal of the bladder from the interior of the cured part, and removing the bladder from the interior for the cured part.

20. A process for manufacturing a golf-club head comprising;

shaping a fluid-removable core in the general form of the club head, placing the core into a flexible, pressurizable, fluid-removable bladder formed of thin thermoplastic film, the bladder comprising thin thermoplastic sheets, wrapping over the assembly of core and bladder at least one ply of fiber impregnated with a curable resin, placing the assembly of core, bladder, and impregnated fiber into a female mold, forming a cured part in the form of a golf-club head by pressurizing the bladder to force the plies against inner surfaces of the mold and heating the mold to cure the resin, removing the cured part from the mold, injecting a fluid through a hole into the interior of the part to disintegrate the fluid-removable core and the fluid removable bladder and to remove solid residues of the disintegrated core and bladder from the interior of the cured part.

21. The process of claim 20 wherein the fluid is water and the fluid removable film of the bladder comprises polyvinyl alcohol.

22. The process of claim 20 wherein two thin thermoplastic sheets are joined by heat sealing to form the pressurizable bladder.

23. The process of claim 22 wherein the two thin thermoplastic sheets are vacuum-formed to conform the bladder to the shape of the core.

24. A method for forming a hollow fiber composite golf club head, the method comprising;

placing a mandrel core of a solvent-soluble material in an pressurizable bladder formed of thin thermoplastic solvent-soluble film to form a bladder/core assembly, wrapping resin impregnated reinforcing fiber around the bladder/core assembly, placing the wrapped bladder/core assembly in a female mold, pressurizing the bladder in the female mold to compact the reinforcing fiber against inner surfaces of the mold and heating the mold to cure the resin to form a cured part, such that compaction of the fiber against the mold is predominantly from the bladder pressurization and no compaction is from the mandrel core, injecting a solvent that dissolves the solvent-soluble material and the solvent-soluble film into the interior of the bladder to dissolve core material and bladder film and to remove solid residues of the dissolved core and bladder from the interior of the cured part, and removing the solid residues from the interior of the cured part.

25. The method of claim 24 wherein the fluid is water and the bladder comprises water-soluble film that is at least partially solubilized when the water is introduced into the interior of the bladder.

* * * * *